US008752147B2

(12) United States Patent
Tamai et al.

(10) Patent No.: US 8,752,147 B2
(45) Date of Patent: *Jun. 10, 2014

(54) SYSTEM AND METHOD FOR TWO-FACTOR USER AUTHENTICATION

(75) Inventors: Shigetomo Tamai, Tokyo (JP); Toru Takano, Tokyo (JP); Tsuyoshi Kobayashi, Tokyo (JP)

(73) Assignee: CSE Co., Ltd, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/520,178

(22) PCT Filed: Oct. 5, 2010

(86) PCT No.: PCT/JP2010/067473
§ 371 (c)(1),
(2), (4) Date: Jun. 29, 2012

(87) PCT Pub. No.: WO2012/046304
PCT Pub. Date: Apr. 12, 2012

(65) Prior Publication Data
US 2013/0185779 A1 Jul. 18, 2013

(51) Int. Cl.
H04L 29/06 (2006.01)
(52) U.S. Cl.
USPC ............ 726/6; 726/3; 726/4; 726/7; 713/168; 713/182
(58) Field of Classification Search
USPC .......................... 726/2–7; 713/168, 182–186
See application file for complete search history.

(56) References Cited

U.S. PATENT DOCUMENTS

2005/0021975 A1* 1/2005 Liu .............................. 713/182
2005/0129242 A1* 6/2005 Glickman .................... 380/270
(Continued)

FOREIGN PATENT DOCUMENTS

JP 2007-264839 A 10/2007
JP 2007-272364 A 10/2007
(Continued)

OTHER PUBLICATIONS

Gaizhen Yang et al, Trusted Computing-Based Double Factor Authentication for Mobile Terminals, pp. 683-685, 2010 International Symposium on Intelligence Information Processing and Trusted Computing, IEEE, 2010.*

(Continued)

Primary Examiner — David García Cervetti
Assistant Examiner — Shanto M Abedin
(74) Attorney, Agent, or Firm — Blakely, Sokoloff, Taylor & Zafman LLP

(57) ABSTRACT

Provided is a two-actor user authentication system with a reduced risk of leakage of authentication information.
The two-factor user authentication system is designed to use, as a password, a one-time-password derivation rule to be applied to certain pattern elements included in a presentation pattern at specific positions so as to create a one-time password, and further use, as a second authentication factor, information identifying a client to be used by a user. An authentication server is operable to generate a pattern seed value adapted to uniquely specify a presentation pattern in combination with a client ID, and transmit the pattern seed value to an authentication-requesting client. The authentication-requesting client is operable to create a presentation pattern based on a client ID acquired therefrom, and display the presentation pattern to allow a user to enter thereinto a one-time password based on the presentation pattern.

9 Claims, 8 Drawing Sheets

(56) References Cited

U.S. PATENT DOCUMENTS

| | | | |
|---|---|---|---|
| 2005/0268107 A1* | 12/2005 | Harris et al. | 713/182 |
| 2006/0282660 A1* | 12/2006 | Varghese et al. | 713/155 |
| 2007/0226784 A1* | 9/2007 | Ueda et al. | 726/5 |
| 2007/0234063 A1* | 10/2007 | Ueda et al. | 713/183 |
| 2008/0046366 A1* | 2/2008 | Bemmel et al. | 705/44 |
| 2009/0063850 A1* | 3/2009 | Joram et al. | 713/155 |
| 2009/0183246 A1* | 7/2009 | Kokologiannakis | 726/7 |
| 2009/0249069 A1* | 10/2009 | Daskalopoulos et al. | 713/169 |
| 2010/0043063 A1 | 2/2010 | Ueda et al. | |
| 2011/0202981 A1* | 8/2011 | Tamai et al. | 726/6 |
| 2011/0307642 A1 | 12/2011 | Yamasaki | |
| 2013/0185778 A1 | 7/2013 | Tamai et al. | |

FOREIGN PATENT DOCUMENTS

| | | |
|---|---|---|
| JP | 2009-223387 A | 10/2009 |
| JP | 2010-034967 A | 2/2010 |
| JP | 2010-097512 A | 4/2010 |
| WO | WO 2009/113286 A1 | 9/2009 |

OTHER PUBLICATIONS

PCT International Search Report for PCT Counterpart Application No. PCT/JP2010/067473 containing Communication relating to the Results of the International Search Report, 5 pgs., (Nov. 2, 2010).

PCT Written Opinion of the International Searching Authority for PCT Counterpart Application No. PCT/JP2010/067473, 10 pgs., (Nov. 2, 2010).

Office Action for Japanese Patent Application No. 2010-545132, 3 pgs., (Dec. 22, 2010).

PCT International Search Report for PCT Application No. PCT/JP2010/067472, (Nov. 2, 2010) 5 pgs.

PCT Written Opinion of the International Searching Authority for PCT Application No. PCT/JP2010/067472, (Nov. 2, 2010) 10 pgs.

Office Action for Japanese Patent Application No. 2010-545126, (Dec. 22, 2010) 3 pgs.

Non-Final Office Action for U.S. Appl. No. 13/520,177, mailed on Dec. 12, 2013.

* cited by examiner

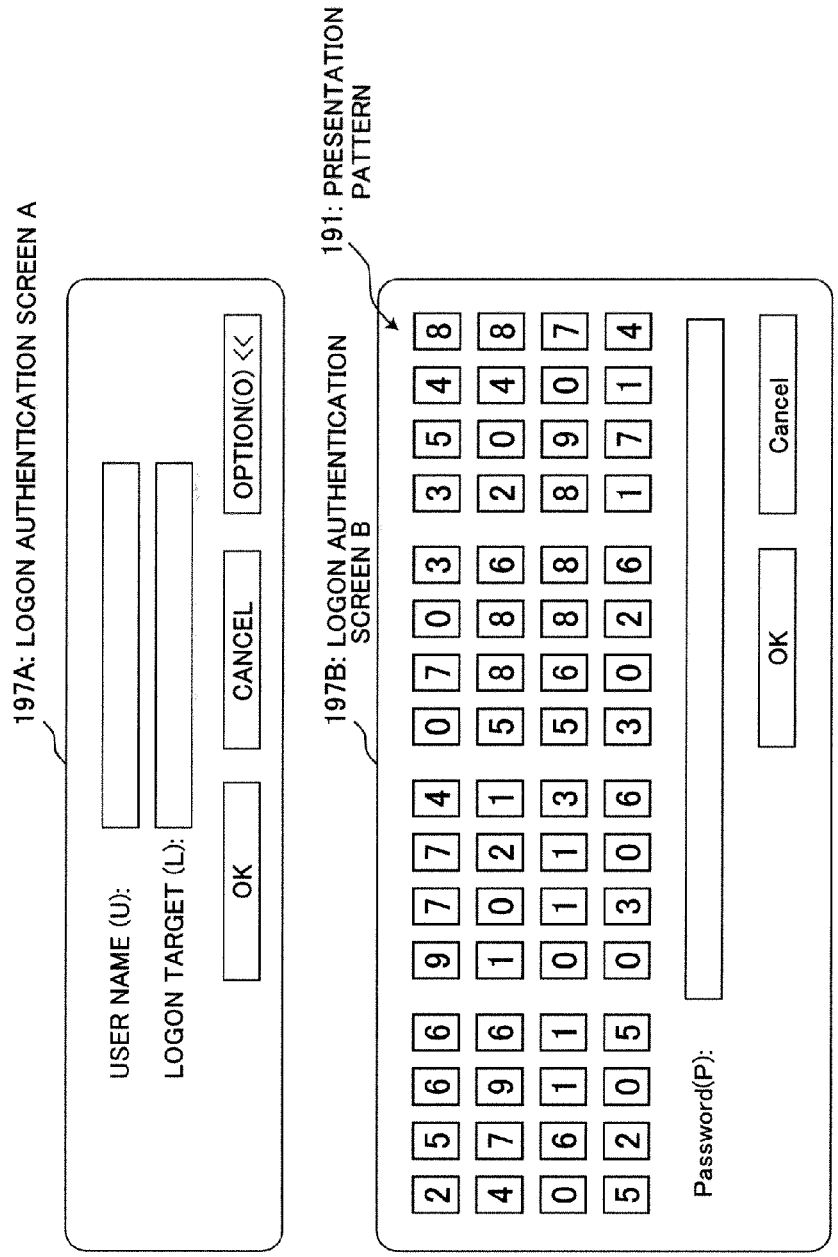

US 8,752,147 B2

SYSTEM AND METHOD FOR TWO-FACTOR USER AUTHENTICATION

CROSS-REFERENCE TO RELATED APPLICATION

This patent application is a U.S. National Phase Application under 35 U.S.C. §371 of International Application No. PCT/JP2010/067473, filed Oct. 5, 2010.

TECHNICAL FIELD

The present invention relates to a user authentication system, and more specifically to a two-factor user authentication system designed to use a one-time-password derivation rule as a password of a user subject to authentication, in such a manner that a plurality of pattern elements are arranged in a given pattern format and presented as a presentation pattern to a client apparatus of the user, and the one-time-password derivation rule is applied to certain ones of the pattern elements included in the presentation pattern at specific positions, so as to create a one-time password, and further use information identifying the client apparatus such as hardware thereof, as a second authentication factor.

BACKGROUND ART

In user authentication systems, a one-time password-based system using a single-use password usable only once for user authentication purpose has become popular as one scheme having higher security than fixed password-based schemes. The one-time password-based system includes a token-based scheme using a token for creating a one-time password in accordance with a one-time-password generation rule synchronous with an authentication server, and a challenge/response scheme designed such that an authentication server transmits to a client a so-called "challenge" which is a value to be varied every time, and the client returns to the authentication server a response created by applying a client's fixed password to the challenge in accordance with a given rule. While the token-based scheme has an advantage of being able to reliably identify a user who owns a token, it forces the user to carry around the token, and has problems about cost of the token and security in the event of loss of the token. In this respect, the challenge/response scheme offers the convenience of being not necessary to use a token. On the other hand, due to a process of generating a one-time password using a client's fixed password which is highly likely to be analogized, the challenge/response scheme involves problems about poor protection against stealing during a password input operation and the need for installing dedicated software to allow a client to generate a response.

Late years, a new user authentication system has been developed based on a so-called "matrix Authentication®" scheme to improve the above problems in the conventional challenge/response scheme. This matrix authentication scheme is designed to arrange a plurality of random numbers in a given pattern format so as to create a matrix-form presentation pattern to be presented to a user requesting authentication, and apply a one-time-password derivation rule serving as a password of the user to certain pattern elements (a part of the random numbers) included in the presentation pattern so as to create a one-time password. Specifically, the presentation pattern is shared in common between a server and a client. Then, instead of a direct comparison of password, the sever carries out user authentication by comparing between a one-time password created on the client side as a result of applying the one-time-password derivation rule or the user's password to the presentation pattern, and a verification code created on the server side as a result of applying the one-time-password derivation rule or the user's password to the presentation pattern. In the matrix authentication scheme, a one-time-password derivation rule serving as a password is information about respective positions of certain pattern elements to be selected on a matrix-form presentation pattern and a selection order of the certain pattern elements, and characterized in that it is easily storable in the form of an image and cannot be figured out as a specific password even if being stolen during a password input operation.

Based on the matrix authentication scheme, a system has also been developed in which a presentation pattern is created based on a combination of a pattern seed value and other information so that it becomes possible to prevent the presentation pattern from being figured out even if the pattern seed value is stolen by a malicious third party through network eavesdropping (tapping or sniffing), etc. (see, for example, the following Patent Document 1). Specifically, in this authentication system, an authentication server is operable to generate and transmit a pattern seed value for creating a presentation pattern, to an authentication-requesting client. In response thereto, the authentication-requesting client is operable to display thereon the presentation pattern using the pattern seed value, and transmit a one-time password entered based on the presentation pattern, to the authentication server so as to perform user authentication through verification of the one-time password.

PRIOR ART DOCUMENTS

Patent Documents

Patent Document 1: JP 2007-264839A

SUMMARY I/F THE INVENTION

Problem to be Solved by the Invention

However, the conventional matrix authentication systems can perform only single-factor authentication using a password of a user, which is information that the user knows. Thus, in the event of leakage of the user's password, it is impossible to avoid fraudulent authentication using the password, which means that there is a limit to security. For this reason, in view of enhancing security, there has been an increasing need for two-factor user authentication using information other than a password, as a second authentication factor. More specifically, there has been a need for, in addition to a password as information that an authentic user knows, using a new authentication factor, such as information indicative of possession of a certain device, or information indicating that a person requesting authentication is identical to the authentic user. However, even if information other than a password is simply added as an authentication factor, leakage of the information is likely to occur through network eavesdropping, etc, and thereby only a limited effect on improvement in security can be obtained. In cases where such information other than a password is created using a one-time-password token, the leakage through network eavesdropping can be avoided, whereas it is necessary to spend a lot of cost and effort to introduce one-time-password tokens for personal use, and an inconvenience is caused by a need to take along the one-time-password token every authentication.

Means for Solving the Problem

In view of the above problems, the present invention provides a two-factor user authentication system designed to use a one-time-password derivation rule as a password of a user subject to authentication, in such a manner that a plurality of pattern elements are arranged in a given pattern format and presented as a presentation pattern to a client being used by the user, and the one-time-password derivation rule is applied to certain ones of the pattern elements included in the presentation pattern at specific positions so as to create a one-time password, and further use information identifying the client being used by the user, as a second authentication factor. The two-factor user authentication system comprises an authentication server and a plurality of the clients each serving as an authentication-requesting client, wherein the authentication server is operable to: pre-store respective user IDs of a plurality of the users, respective one-time-password derivation rules of the users, and respective client IDs of the clients to be used by the respective users as the authentication-requesting client, in associated relation with each other on a user-by-user basis; in accordance with a given generation rule, generate a pattern seed value adapted to uniquely specify a presentation pattern in combination with one of the client IDs; and transmit the generated pattern seed value to the authentication-requesting client, and wherein the authentication-requesting client is operable to: acquire the client ID of the authentication-requesting client when used by one of the users who requests authentication; based on the acquired client ID and the pattern seed value received from the authentication server and in accordance with a given pattern-element-sequence creation rule, create and display a presentation pattern; allow the requesting user to enter therefrom a one-time password created as a result of applying the one-time-password derivation rule of the requesting user to certain ones of the pattern elements included in the displayed presentation pattern; and transmit the entered one-time password to the authentication server, and wherein the authentication server is operable to: create a verification code as a result of applying the pre-stored one-time-password derivation rule associated with the user ID received from the authentication-requesting client, to certain pattern elements included in a presentation pattern formed from a pattern element sequence which is created based on the transmitted pattern seed value and the pre-stored client ID associated with the received user ID and in accordance with the given pattern-element-sequence creation rule; and compare the one-time password received from the authentication-requesting client, with the created verification code, to perform user authentication.

In the present invention, when a presentation pattern is created based on the pattern seed value, it may be created based on a combination with a plurality of types of client IDs (client ID group).

Alternatively or additionally, in the present invention, in advance of creating a presentation pattern based on the pattern seed value, the user ID of the requesting user may be combined with the pattern seed value, in addition to the client ID.

The two-factor user authentication system of the present invention may be configured to acquire, as the client ID, identification information incorporated in hardware of the authentication-requesting client.

Alternatively, the two-factor user authentication system of the present invention may be configured to acquire, as the client ID, identification information about an external device through an interface of the authentication-requesting client.

Alternatively, the two-factor user authentication system of the present invention may be configured to acquire, as the client ID, identification information about an operating system of the authentication-requesting client.

Alternatively, the two-factor user authentication system of the present invention may be configured to acquire, as the client ID, a network address set for the authentication-requesting client.

Alternatively, the two-factor user authentication system of the present invention may be configured to acquire, as the client ID, biological identification information about the requesting user.

In the inventions described above or set forth in the appended claims, each of the terms "server" and "client" is not intended to express a device, apparatus or system having a specific configuration or function, but to express a device, apparatus or system having a typical function. Further, a function of a single component or claim-element may be achieved by two or more physical means, and a function of two or more components or claim-elements may be achieved by a single physical means. In the appended claims, a system claim may be recognized as a method or process claim defined such that respective functions of claim elements in the system claim are sequentially executed, and the opposite is true. It is understood that the steps defined in the method claim are not necessarily executed in order of description but may be executed in any suitable order allowing an intended function to be achieved in their entirety. The system and method of the present invention may be designed using a program capable of partly or entirely achieving the intended function in cooperation with given hardware, or a recording medium having the program recorded thereon.

Effect of the Invention

The two-factor user authentication system of the present invention is designed to use a one-time-password derivation rule as a password, in such a manner that a presentation pattern is presented to a client being used by a user subjected to authentication, and the one-time-password derivation rule is applied to certain ones of a plurality of pattern elements included in the presentation pattern at specific positions so as to create a one-time password, and further use information identifying the client being used by the user, as a second authentication factor. The authentication server is operable to generate a pattern seed value adapted to uniquely specify a presentation pattern in combination with one of a plurality of client IDs to be used by respective users as an authentication-requesting client, and transmit the generated pattern seed value to the authentication-requesting client. The authentication-requesting client is operable to: acquire the client ID of the authentication-requesting client when used by one of the users who requests authentication; based on the acquired client ID and the pattern seed value received from the authentication server and in accordance with a given pattern-element-sequence creation rule, create and display a presentation pattern; allow the requesting user to enter a one-time password therefrom; and transmit the entered one-time password to the authentication server. The authentication server is further operable to: re-create a presentation pattern so as to create a verification code, and compare the verification code with the one-time password to perform user authentication. Thus, in addition to the user's password, which is information that the user knows, the client ID can be used as a second authentication factor, so that it becomes possible to achieve two-factor authentication in which a fact of physically possessing a device capable of outputting the client ID serves as an additional condition for verification during authentication. In addition, the client ID itself is not subjected to the verification during authentication, so that even if the one-time password is stolen during authentication through network eavesdropping, the client ID will never be leaked from the one-time password. More specifically, even if the one-time password is stolen during authentication through network eavesdropping, it is impossible to infer a presentation pattern and a one-time-password derivation rule, so that it becomes possible to obtain strong security. As the device capable of outputting the client ID, a wide range of devices including the off-line authentication-requesting client itself may be used. This makes it possible to minimize the cost and effort for introducing the system, and minimize the burden of carrying around the device capable of outputting the client ID.

In the present invention, when a presentation pattern is created based on the pattern seed value, it may be created based on a combination with a plurality of types of client IDs (client ID group). In this case, the number of authentication factors can be substantially increased up to three or more so as to obtain stronger security.

Alternatively or additionally, in the present invention, in advance of creating a presentation pattern based on the pattern seed value, the user ID of the requesting user may be combined with the pattern seed value, in addition to the client ID. In this case, even if the pattern seed value is stolen through network eavesdropping, it becomes more difficult to infer a presentation pattern from the pattern seed value, so that it becomes possible to obtain stronger security.

The two-factor user authentication system of the present invention may be configured to acquire, as the client ID, identification information incorporated in hardware of the authentication-requesting client, or identification information about an operating system of the authentication-requesting client, or a network address set for the authentication-requesting client. In this case, information based on a fact of physically possessing the authentication-requesting client serves as an additional condition for verification during authentication, so that the security is enhanced. Alternatively, the two-factor user authentication system of the present invention may be configured to acquire, as the client ID, identification information about an external device through an interface of the authentication-requesting client. In this case, a fact of physically possessing the external device serves as an additional condition for verification during authentication, so that security is enhanced. Alternatively, the two-factor user authentication system of the present invention may be configured to acquire, as the client ID, biological identification information about the requesting user. In this case, biological information indicative of identity serves as an additional condition for verification during authentication, so that security is enhanced.

BRIEF DESCRIPTION I/F THE DRAWINGS

FIG. 8 is a schematic diagram illustrating an image on a Windows® logon authentication screen in the two-factor user authentication system 100.

DETAILED DESCRIPTION

The present invention will now be described based on an embodiment thereof. To begin with, an explanation of techniques unique to a matrix authentication scheme will be made below. The matrix authentication scheme is designed to use a one-time-password derivation rule $102b$ as a password of a user subject to authentication, in such a manner that a plurality of pattern elements (pattern element sequence 190) are arranged in a given pattern format and presented as a presentation pattern 191 to a client apparatus being used by the user, and the one-time-password derivation rule $102b$ is applied to certain ones of the pattern elements included in the presentation pattern 191 at specific positions, so as to create a one-time password.

(Presentation Pattern and Pattern Elements)

The presentation pattern 191 consists of a plurality of pattern elements arranged in a given pattern format. Typically, the given pattern format is a matrix comprised of a plurality of matrix elements arranged in m columns×n rows to form a rectangular shape in its entirety, or by arranging a plurality of the matrixes. Alternatively, it may be any other suitable graphic pattern. In this specification, an authentication scheme using a presentation pattern arranged in any pattern format other than the typical matrix form will also be referred to as "matrix authentication scheme". Preferably, the given pattern format is formed as an orderly pattern or an impressive pattern easily remaining in user's memory to allow a user to easily remember a one-time-password derivation rule $102b$ serving as a password of the user.

The term "pattern element" means an element to be arranged at a given position in the given patter format so as to constitute a presentation pattern. Preferably, the pattern element is selected from one-digit numerals 0 (zero) to 9. Alternatively, the pattern element may be any other suitable character, such as alphabet or symbol. As the symbol, it is particularly preferable to use "+", "−", "*", "=", " ", "!", "?", "#", "$" or "&" which is assigned to a standard keyboard for a personal computer (PC). The character may include a figure, such as graphic, illustration or photograph. Preferably, a single presentation pattern includes two or more same pattern elements. In this case, there is a many-to-one correspondence between a one-time-password derivation rule $102b$ serving as a password and a one-time password 192 created as a result of applying the one-time-password derivation rule $102b$ to the presentation pattern, which means that the one-time-password derivation rule $102b$ is automatically hashed during input of the one-time password 192. In other words, a processing similar to a hash function algorithm is automatically performed during input of the one-time password 192. Thus, even if the presentation pattern has already been figured out, the one-time-password derivation rule $102b$ cannot be figured out based on only one one-time password 192.

Figure 7:
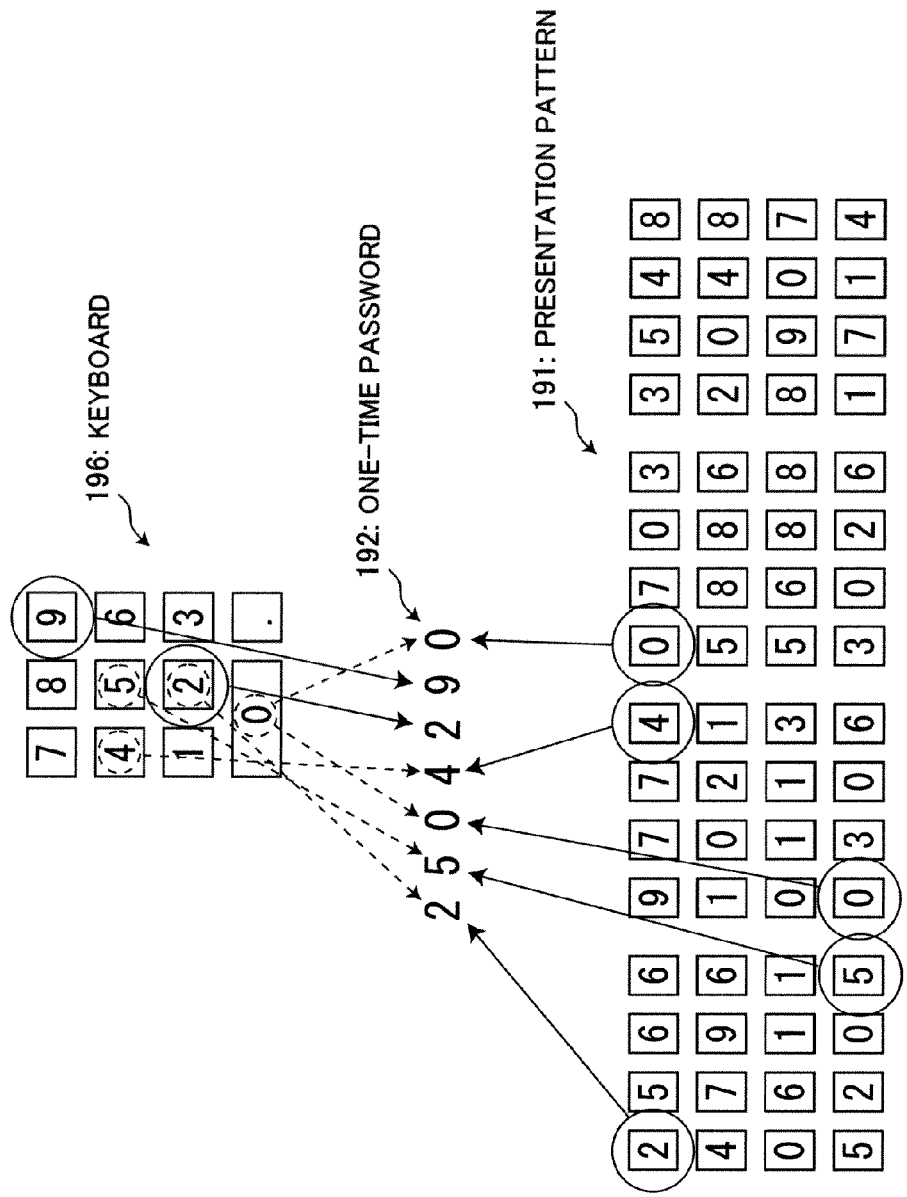
FIG. 7 is a conceptual diagram illustrating a process of entering a one-time password, in the matrix authentication scheme.

In this embodiment, as illustrated, for example, in FIG. 7, a presentation pattern 191 is created by arranging a plurality of pattern elements each selected from one-digit numerals 0 to 9, in a given pattern format $191p$ comprised of four 4-by-4 matrixes. In a client having a display screen with a small area, such as a portable phone, it is preferable to use a presentation pattern in which the number of 4-by-4 matrixes is reduced, for example, to three.

(Pattern Element Sequence)

The pattern element sequence 190 is data indicative of the content of a plurality of pattern elements to be arranged in the given pattern format 191p so as to create a presentation pattern 191. Typically, it is a sequence in which all of the pattern elements to be comprised in the presentation pattern 191 are arranged in order. The pattern element sequence 190 is created in advance of creating the presentation pattern 191. It should be noted that the pattern element sequence 190 is not limited to one character sequence created by arranging a plurality of pattern elements in order, but defined as data including information about all of a plurality of pattern elements to be comprised in a single presentation pattern 191. Thus, as long as the pattern elements to be comprised in the pattern element sequence 190 are associated with respective positions in a presentation pattern, the order of the pattern elements comprised in the pattern element sequence 190 may be freely set. Further, the pattern element sequence 190 may be divided into a plurality of data. A two-factor user authentication system 100 according to one embodiment of the present invention roughly comprises an authentication server 101 for authenticating users, and a plurality of clients each connected to the authentication server to serve as an authentication-requesting client 151 which is a terminal for allowing each of the users to request authentication therethrough. In the two-factor user authentication system 100, the pattern element sequence 190 is created in the authentication-requesting client 151 and used for creating a presentation pattern 191 in the authentication-requesting client 151. In other words, the pattern element sequence 190 is never transmitted to the authentication server 101 via a network in its raw or untransformed form.

(One-Time-Password Derivation Rule)

The one-time-password derivation rule 102b is a rule to be applied to certain pattern elements included in a presentation pattern 191 at specific positions so as to create a one-time password 192, and is data serving as a password of a user. Typically, the "rule to be applied to certain pattern elements" is a rule for selecting certain pattern elements at specific positions in a specific order. In this embodiment, the one-time-password derivation rule 102b is information consisting of a combination of respective positions of certain ones to be selected from a plurality of pattern elements comprised in a presentation pattern 191, and a selection order of the certain pattern elements. The one-time-password derivation rule 102b may additionally include information about a fixed character, such as a fixed numeral, to be entered without being based on a presentation pattern 191. In this case, the one-time-password derivation rule 102b is information consisting of a combination of: respective positions of certain ones to be selected from the pattern elements comprised in the presentation pattern 191; at least one fixed character to be entered without being based on the presentation patter 191; and a selection or input order of the certain pattern elements and the fixed character.

Figure 6:
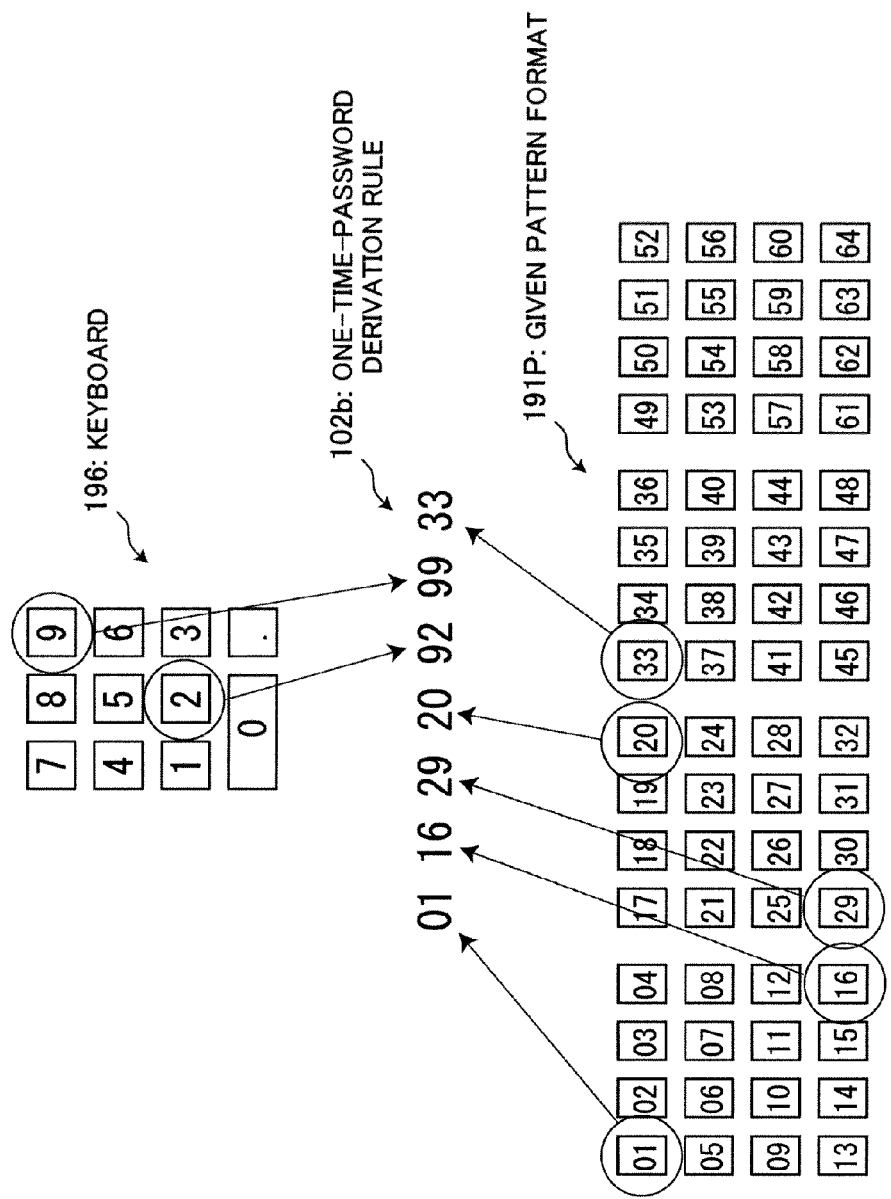
FIG. 6 is a conceptual diagram illustrating a one-time-password derivation rule in a matrix authentication scheme.

FIG. 6 illustrates a structure of a typical one-time-password derivation rule 102b. In this embodiment, the one-time-password derivation rule 102b is applied to a presentation pattern 191 created by arranging sixty four pattern elements each selected from one-digit numerals 0 to 9, in the given pattern format 191p comprised of four 4-by-4 matrixes. In FIG. 6, respective positions of the pattern elements in the given pattern format 191p are distinguishably presented by sixty four numerals 01 to 64. When the presentation pattern 191 is presented to a user requesting authentication (hereinafter referred to simply as "requesting user"), one of the one-digit numerals 0 to 9 will be presented at a respective one of the positions of the pattern elements in the given pattern format 191p.

Preferably, the one-time password 192 to be entered comprises a variable numeral to be entered based on the presentation pattern 191, and a fixed numeral to be entered without being based on the presentation pattern 191. The number of pattern elements comprised in the presentation pattern 191 is sixty four. Thus, selected ones of the positions of the sixty four pattern elements comprised in the presentation pattern 191 are represented by corresponding ones of two-digit numerals 01 to 64 assigned to the respective positions. Further, the fixed numeral to be entered without being based on the presentation pattern 191 is represented by a two-digit numeral which consists of "9" to be assigned to a tens digit thereof to denote that the entered numeral is a fixed numeral, and one of one-digit numerals 0 to 9 to be assigned to a unit digit thereof. As illustrated in FIG. 6, initial four numerals of the one-time password 192 are entered by selecting four of the pattern elements of the presentation pattern 191 at specific positions. As a part of the one-time-password derivation rule 102b corresponding to the initial four numerals of the one-time password 192, "01", "16", "29", "20" which are numerals indicative of respective positions of the four pattern elements, are arranged in this order. The selected pattern elements are entered using a keyboard 196 or the like. Subsequent two numerals of the one-time password 192 are entered using the keyboard 196 or the like without being based on the presentation pattern 191. As a part of the one-time-password derivation rule 102b corresponding to the two numerals of the one-time password 192, "92" and "99" are subsequently arranged in this order, wherein the numeral "2" or "9" to be entered as a part of the one-time password 192 is added to the numeral "9" denoting a direct input. Subsequent last one numeral of the one-time password 192 is entered by selecting one of the pattern elements of the presentation pattern 191 at a specific position. As a part of the one-time-password derivation rule 102b corresponding to the last one numeral of the one-time password 192, "33" which is a numeral indicative of the position of the lastly selected pattern element, is subsequently arranged, and the one-time-password derivation rule 102b is terminated in the numeral "33". The one-time-password derivation rule 102b may be configured such that an end mark uniquely defining a termination point thereof, such as a numeral "00", is added to a tail end thereof, or a numerical value indicating the entire length thereof is associated therewith.

(Pattern Seed Value)

The pattern seed value 183 is adapted to be transformed according to a given transformation rule so as to uniquely specify a plurality of pattern elements to be comprised in a single presentation pattern 191. The pattern seed value 183 itself is generated in a given range according to a given generation rule. In the present invention, the pattern seed value 183 has a key feature in that it is combined with additional information as a second factor, before being subjected to a given transformation rule to create a plurality of pattern elements to be comprised in a single presentation pattern 191, as described in detail later.

As a prerequisite to allowing the authentication server 101 to verify whether a one-time password entered from the authentication-requesting client 151 is proper, it is necessary for the authentication server 101 to know a presentation pattern 191 to be presented to the authentication-requesting client 151. However, if a presentation pattern 191 itself is transmitted from the authentication server 101 to the authentication-requesting client 151, the transmitted presentation pattern 191 is likely to be acquired by a malicious third party through network eavesdropping or the like, which causes a risk that the password is inferred. On the other hand, the authentication server 101 can verify a one-time password 192 only if a presentation pattern 191 is shared between the authentication server 101 and the authentication-requesting client 151. The pattern seed value 183 is intended to solve the above contradictory requirements, and adapted to uniquely specify a presentation pattern 191 only after being subjected to the given transformation rule, i.e., it is information which is not identical to a pattern element sequence 190. In other words, in order to avoid transmission of a pattern element sequence 190 itself from the authentication server 101 to the authentication-requesting client 151, the pattern seed value 183 is transmitted in place of the pattern element sequence 190. The authentication-requesting client 151 is operable to subject the pattern seed value 183 received from the authentication server 101, to a given transformation rule to create a presentation pattern 191. For example, it is contemplated to use a hash function algorithm as the given transformation rule. As above, the pattern seed value 183 is used to prevent a pattern element sequence 190 itself from streaming on a network, so that security is enhanced.

In the present invention, in advance of creating a plurality of pattern elements to be comprised in a single presentation pattern 191, the pattern seed value 183 is combined with additional information as a second factor, in accordance with a given transformation rule. As the second factor, a client ID 102c of the authentication-requesting client 151 to be acquired when used by the requesting user is used. In this case, a fact of possessing a device capable of outputting a client ID 102c serves as an additional condition for verification during authentication, so that security is enhanced. More specifically, the pattern seed value 183 is adapted to uniquely specify a plurality of pattern elements to be comprised in a single presentation pattern 191, in combination with the client ID 102c. As a result, the presentation pattern 191 is created while incorporating not only information about the pattern seed value 183 but also the client ID 102c, so that it becomes possible to verify whether a one-time password 192 is entered based on a presentation pattern 191 created using a proper client ID 102c. In the present invention, information about the client ID 102c is incorporated in a presentation pattern 191 by scrambling the presentation pattern 191 using the client ID 102c of the authentication-requesting client 151. A one-time password 192 is obtained as a result of applying a one-time-password derivation rule 102b of the requesting user, to the presentation pattern 191 created in the above manner. As above, in the present invention, a one-time password 192 includes information which determines the success or failure of authentication based on two factors: a first factor of whether the one-time password 192 is entered based on a proper one-time-password derivation rule 102b, i.e., by a proper user; and a second factor of whether the one-time password 192 is entered from an authentication-requesting client 151 having a proper client ID 102c, i.e., possessed by the proper user. This makes it possible to perform two-factor authentication, which provides drastically enhanced security.

The present invention has a key feature in that, despite the authentication using a client ID 102c as the second factor, the client ID 102c itself is not verified during user authentication. This means that, even if a one-time password is stolen during authentication through network eavesdropping, the client ID 102c will never be leaked from the one-time password. More specifically, even if a one-time password is stolen during authentication through network eavesdropping, it is impossible to infer a presentation pattern and a one-time-password derivation rule, so that it becomes possible to obtain strong security. As above, the client ID 102c as the second factor can be added as a second authentication factor, without causing a risk of leakage of the client ID 102c.

Further, in the operation of creating a presentation pattern 191, a plurality of types of client IDs (client ID group) 102c may be used together. In this case, a pattern seed value 183 will specify a plurality of pattern elements to be comprised in a presentation pattern 191, in combination with the plurality of types of client IDs 102c. As long as the plurality of types of client IDs 102c originate from different sources, respectively, even though they are associated with a common authentication-requesting client 151, the number of authentication factors can be substantially increased up to three or more so as to obtain stronger security.

It is also effective that, in the operation of creating a presentation pattern 191, other information is additionally used to further scramble the presentation pattern 191. For example, as such other information, it is possible to use a user ID 102a. In this case, a pattern seed value 183 will uniquely specify a plurality of pattern elements to be comprised in a single presentation pattern 191, in combination with the user ID 102a and the client ID 102c. The user ID 102a is information originating from a user, and thereby it cannot be said that such a processing contributes to an increase in the number of authentication factors. However, a calculation using the user ID 102a is additionally required to create a presentation pattern 191 from a pattern seed value 183, so that it becomes more difficult to infer the presentation pattern 191 from a one-time password 192. Therefore, security can be further enhanced by additionally using the user ID 102a to create a presentation pattern 191.

Typically, a pattern seed value 183 is a numerical value generated in accordance with a random-number generation algorithm to fall within a given range. Instead of the random-number generation algorithm, the pattern seed value 183 may be generated in accordance with any other suitable rule for generating a numerical value within the given range, such as a count-up or count-down operation for sequentially adding or subtracting a given value to or from a given initial value.

(One-Time Password)

A one-time password 192 is a single-use password to be created/entered by the requesting user, through an operation of applying a one-time-password derivation rule 102b of the requesting user to a presentation pattern 191. FIG. 7 is a conceptual diagram illustrating a process of entering a one-time password in the matrix authentication scheme. The requesting user sequentially extracts certain numerals presented at given positions on a matrix while applying the one-time-password derivation rule 102b to the presentation pattern 191, to create a one-time password 192, and enters the one-time password 192 into the authentication-requesting client 151. The one-time password 192 may be entered, including a fixed numeral without being based on the presentation pattern 191. In other words, a fixed password may be included in the one-time password. The arrowed lines and circles each indicated by the dashed line in FIG. 7 denote that a one-time password based on the presentation pattern 191 is entered from a keyboard 196. As illustrated in FIG. 7, "2504" is entered based on the presentation pattern 191. Subsequently, "29" is entered as fixed numerals without being based on the presentation pattern 191, and then "0" is entered based on the presentation pattern 191. As a result, "2504290" is entered as a one-time password 192.

[User Authentication Process of the Present Invention]

Figure 1:
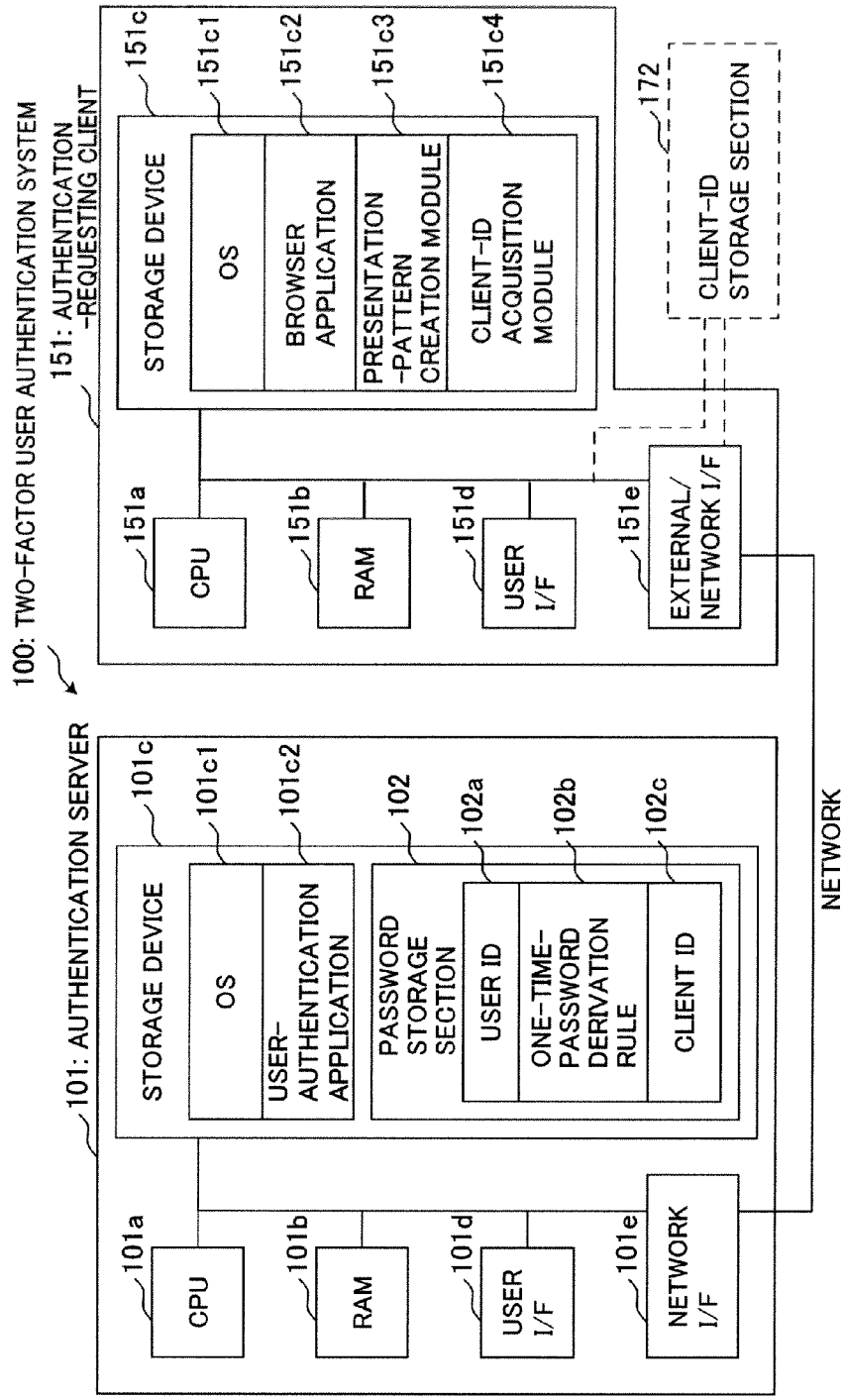
FIG. 1 is a block diagram illustrating a hardware configuration of a two-factor user authentication system 100 according to one embodiment of the present invention.
Figure 2:
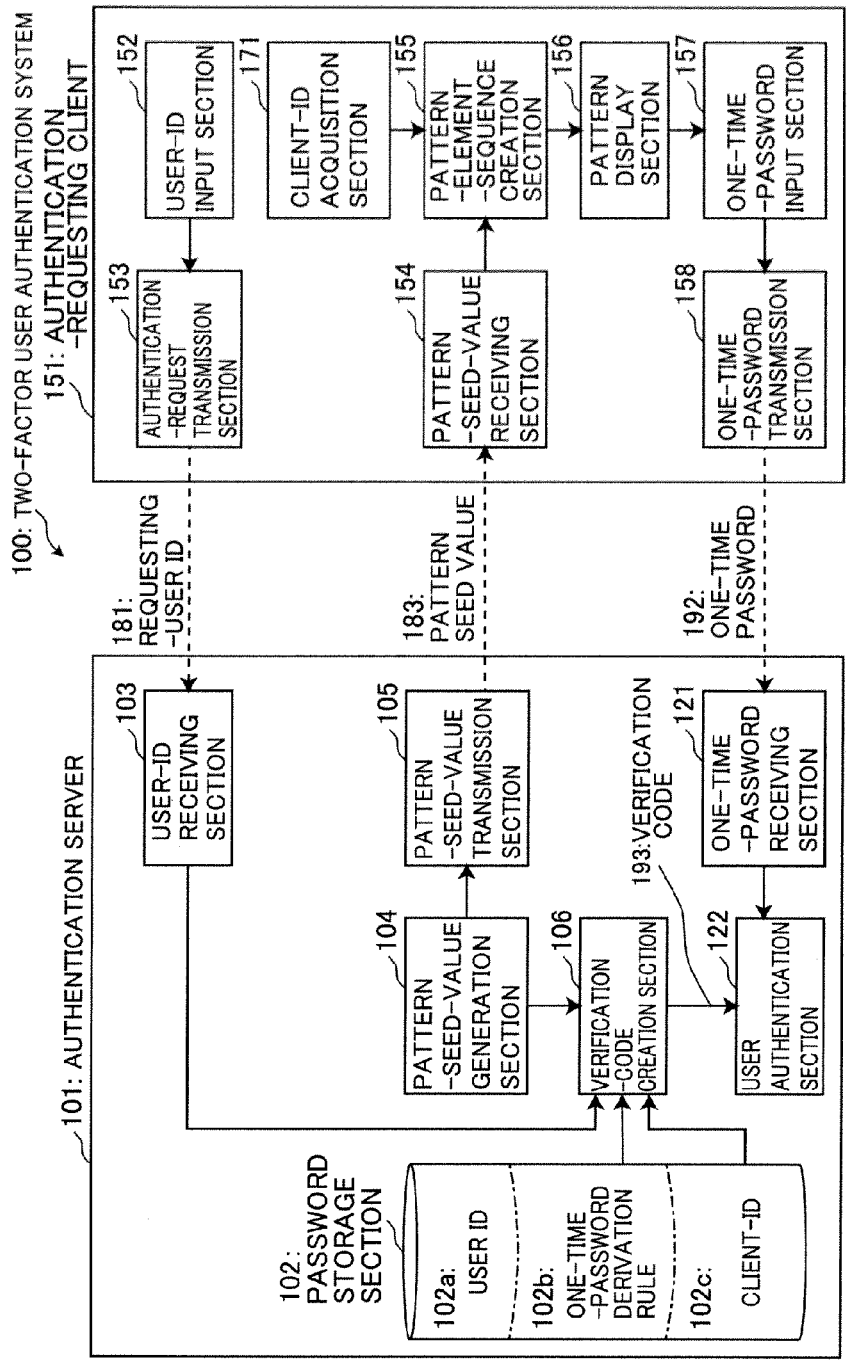
FIG. 2 is a block diagram illustrating a functional configuration of the two-factor user authentication system 100.
Figure 3:
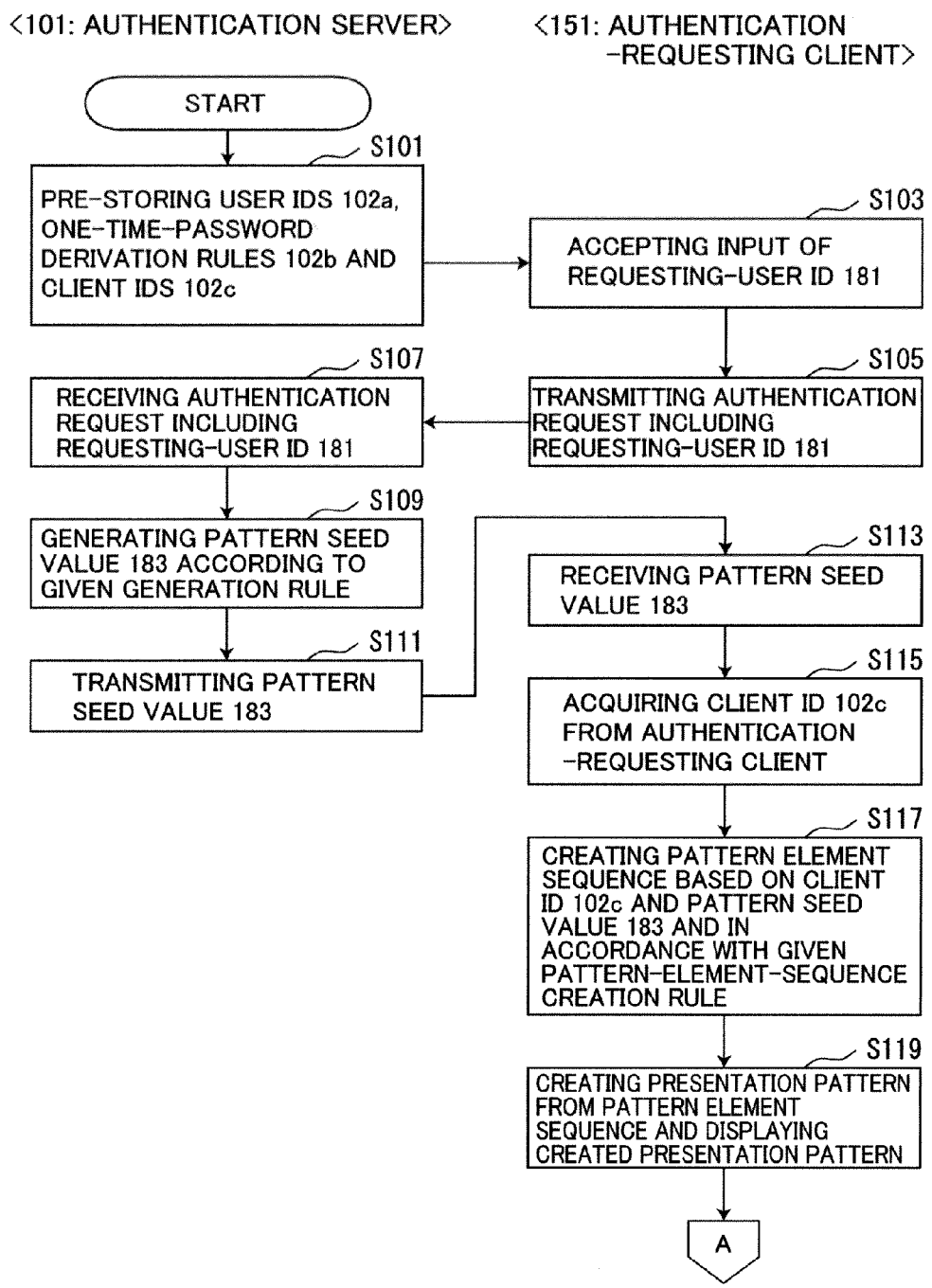
FIG. 3 is a flowchart illustrating an operation of the two-factor user authentication system 100.
Figure 4:
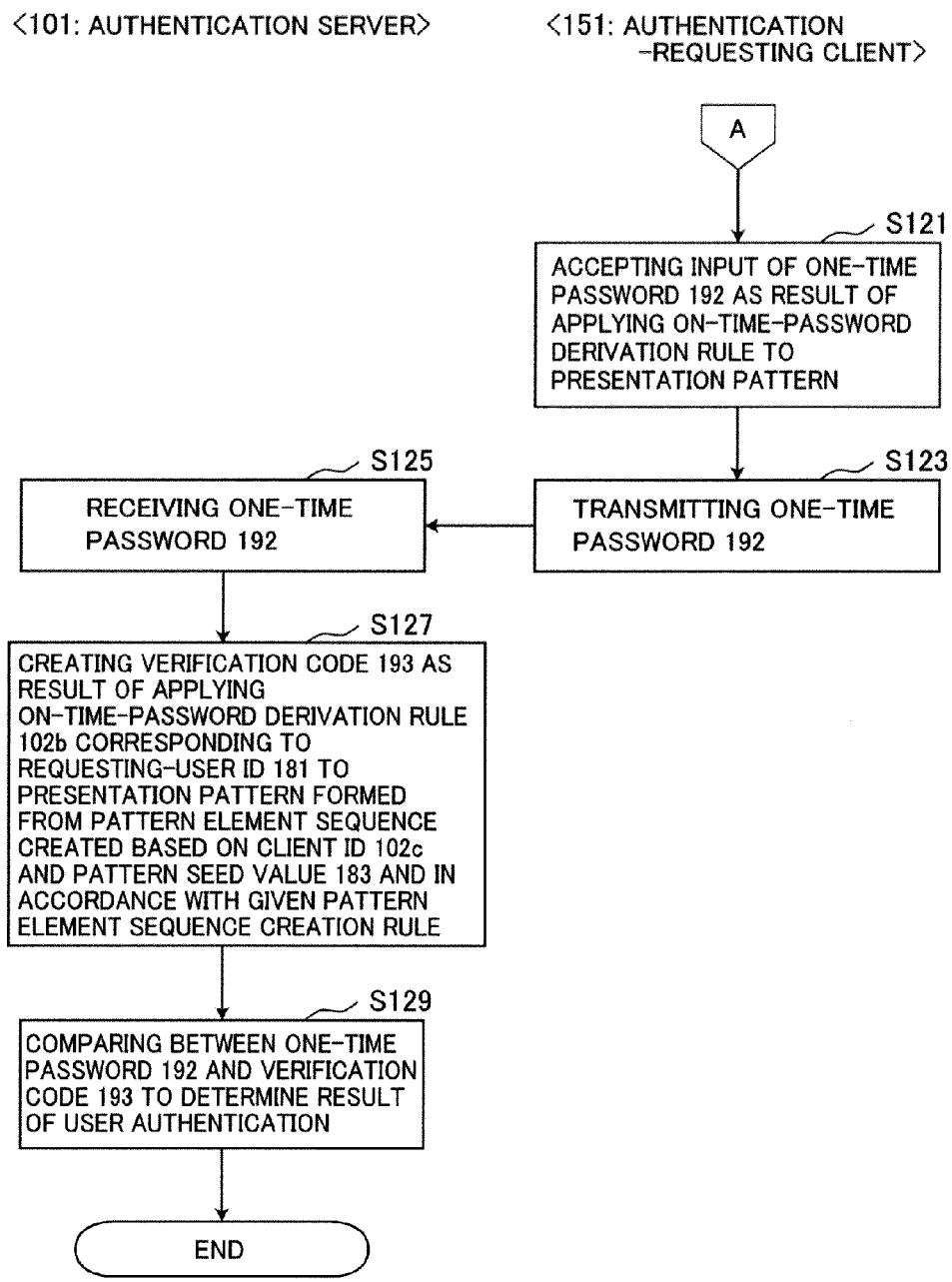
FIG. 4 is a flowchart illustrating an operation of the two-factor user authentication system 100, which is continued from the flowchart illustrated in FIG. 3.

With reference to the drawings, the two-factor user authentication system 100 according to one embodiment of the present invention will be described. FIG. 1 is a block diagram illustrating a hardware configuration thereof, and FIG. 2 is a block diagram illustrating a functional configuration thereof. FIGS. 3 and 4 are flowcharts illustrating an operation thereof. Firstly, an outline of a user authentication process of the present invention will be described below. The user authentication process according to this embodiment is based on the aforementioned matrix authentication scheme which is one type of challenge/response authentication schemes. In the user authentication process of the present invention, a one-time-password derivation rule 102b is used as a password of a user subject to authentication, in such a manner that a plurality of pattern elements (equivalent to challenge codes) are arranged in a given pattern format and presented as a presentation pattern 191 to the user in an authentication-requesting client 151, and the one-time-password derivation rule 102b is applied to certain ones of the pattern elements included in the presentation pattern 191 at specific positions, so as to create a one-time password 192 (equivalent to a response). An authentication server 101 operates to generate a pattern seed value 183 which is information necessary for the authentication-requesting client 151 to create the presentation pattern 191 to be presented to the user in the authentication-requesting client 151, and transmit the pattern seed value 183 to the authentication-requesting client 151. The presentation pattern 191 is created based on the transmitted pattern seed value 183 and a client ID 102c. The authentication-requesting client 151 operates to allow the user to enter the one-time password 192 based on the presentation pattern 191, and transmit the one-time password 192 to the authentication server 101 therefrom. Then, the authentication server 101 operates to re-create a presentation pattern based on the transmitted pattern seed value 183 and a client ID 102c associated with a user ID of the user, and apply the one-time-password derivation rule 102b serving as a password of the user to the re-created presentation pattern so as to create a verification code 193. Then, the authentication server 101 operates to compare the verification code 193 with the one-time password 192 transmitted from the authentication-requesting client 151, wherein, if they are identical to one another, it determines that the user is successfully authenticated, and operates to start a given operation in the event of successful authentication.

[Hardware Configuration of Two-Factor User Authentication System 100]

A configuration of the two-factor user authentication system 100 will be described below. FIG. 1 is a block diagram illustrating a hardware configuration of the two-factor user authentication system 100 according to this embodiment. Referring to FIG. 1, the two-factor user authentication system 100 generally comprises the authentication server 101 and the plurality of clients each serving as the authentication-requesting client 151. The authentication server 101 includes a CPU 101a, a RAM 101b, a storage device 101c, a user interface (user I/F) 101d, and a network interface (network I/F) 101e, which are connected to each other via a bus. The storage device 101c has a storage area which stores an OS 101c1 and a user-authentication application 101c2 and includes a password storage section 102 in a storage area thereof. The password storage section 102 stores user IDs 102a, one-time-password derivation rules 102b and client IDs 102c, in associated relation with each other on a user-by-user basis. The authentication-requesting client 151 includes a CPU 151a, a RAM 151b, a storage device 151c, a user interface (user I/F) 151d, and a network interface (network I/F) 151e, which are connected to each other via a bus. The storage device 151c stores an OS 151c1, a browser application 151c2, a presentation-pattern creation module 151c3, and a client-ID acquisition module 151c4, in the storage area thereof.

In the two-factor user authentication system 100, the authentication server 101 is a component for performing user authentication in response to a user authentication request from the authentication-requesting client 151. For example, the authentication server 101 is configured as a server computer having the OS 101c1 and the user-authentication application 101c2 installed thereon. Alternatively, the authentication server 101 may be configured as a hardware for providing user authentication in a gateway apparatus, such as SSL-VPN gateway, for providing a virtual leased-line network on the Internet. The CPU 101a is a processor operable to execute the user-authentication application 101c2, etc., on the OS 101c1 so as to perform information processing for user authentication. The RAM 101b is a memory for providing a memory space allowing software stored on the storage device 101c to be read thereon and a work area required when the read software is executed by the CPU 101a. The storage device 101c is adapted to store/manage information, such as software and data, and typically configured as a hard disk drive. Preferably, the storage device 101c stores a file of programs of the OS 101c1 and the user-authentication application 101c2, and these programs will be read on the RAM 101b and executed. As for the programs of the OS 101c1 and the user-authentication application 101c2, the storage device 101c may be configured as a ROM storing them thereon. In this case, the ROM serves as a firmware in cooperation with a program execution element, such as the CPU 101a. The user I/F 101d is operable to allow data to be input/output from/to a user therethrough, and typically comprised of: key input device, such as a keyboard 196 or a software keyboard; output device, such as a display, for displaying information on a screen; and a hardware I/F between the key input device and the output device. As the keyboard 196, it is possible to use any suitable type capable of entering therethrough a plurality of pattern elements for forming a one-time password, such as a numeric keypad or a standard full keyboard. The software keyboard is designed to accept key input in such a manner as to display symbols of a keyboard on a display screen, and allow a user to select the symbol corresponding to a desired key, using a pointing device, such as a touch panel, a mouse or a track ball. The network I/F 101e is adapted to be connected to a network so as to allow information to be input/output from/to the network.

The OS 101c1 and the user-authentication application 101c2 may be combined together in the form of an integrated program. For example, the OS 101c1 may include the functions of the user-authentication application 101c2. Further, the user-authentication application 101c2 may be incorporated in another application. Each of the OS and the application may be divided into a plurality of programs.

The authentication server 101 is connected to the authentication-requesting client 151 via a network. Preferably, the network is the Internet or an intranet operable in accordance with a TCP/IP-based protocol. When the authentication-requesting client 151 in an intranet operates based on a client Windows® OS, the network may be a Windows® domain network operable in accordance with a TCP/IP-based protocol. Although the OS in this specification is described by taking a Windows® OS as an example, any other suitable OS, such as Mac OS®, Linux® or Unix®, may also be used.

The user authentication process of the present invention may be implemented in at least the following two modes. In a first mode, the process is used for performing authentication when a user desires to receive a Web service. For example, a mode can be assumed in which the authentication of the user is performed for permission of the use of a Web service when the user desires to use a content, a SSL-VPN service or an application on the Web via a Web browser under a condition that the authentication-requesting client 151 of the user is connected to the Web service on the Web. In this case, the authentication server 101 may be typically configured as a Web server which is disposed on a network, such as the Internet or an intranet, to provide a Web page for user authentication to the authentication-requesting client 151 accessing via the network and transmit/receive data about user authentication through the Web page, or may be configured as an apparatus designed to perform an authentication/accounting management in cooperation with a RADIUS server and provide a virtual leased-line network, such as SSL-VPN gateway, on the Internet.

In a second mode, the process is used for performing authentication when a user desires to establish connection to a network environment managed by an OS. For example, a mode can be assumed in which the authentication of the user is performed for authorizing the user to logon to a common Windows® domain network with the authentication server 101 when the user accesses the network as a proper network user, using the authentication-requesting client 151. In this case, the authentication server 101 is typically designed to provide a resource for authentication, on a network, and operable to perform user authentication when the user issues an authentication request for logon to the Windows® domain network using the authentication-requesting client 151, and inform the authentication result to a domain controller for managing authorization of network users of the Windows® domain network.

The OS 101c1 is an operating system closely related to hardware of the authentication server 101 and operable to perform fundamental information processing. The user-authentication application 101c2 is an application software for user authentication which operates on the OS 101c1. In the authentication server 101 configured as a Web server, the user-authentication application 101c2 is typically a Web server program which includes a servlet-type authentication program or an authentication program to be called through a CGI, and is operable to provide a Web page or resource for authentication on the Web of the Internet or an intranet. The password storage section 102 is typically a partial area of a hard disk drive or the like. Preferably, data is stored on the password storage section 102 in the form of an encrypted file. The user ID 102a is data for uniquely identifying each user. Any type of character sequence may be used as the user ID 102a. As mentioned above, the one-time-password derivation rule 102b is a rule to be applied to certain pattern elements included in a presentation pattern at specific positions so as to create a one-time password, and is data serving as a password of each user. The client ID 102c is data for identifying the authentication client 151 when used by a requesting user, and is data to be used in an operation of creating a presentation pattern, in combination with a pattern seed value.

In the two-factor user authentication system 100, the authentication-requesting client 151 is a component for allowing each of the users to request authentication to the authentication server 101. The authentication-requesting client 151 is a terminal having the OS 151c1, the browser application 151c2, the presentation-pattern creation module 151c3, and the client-ID acquisition module 151c4, which are installed therein. Specifically, the authentication-requesting client 151 may be configured as a PC, a portable phone or a personal digital assistant (PDA). The CPU 151a is a processor operable to execute the browser application 151c2, the presentation-pattern creation module 151c3, the client-ID acquisition module 151c4, etc., on the OS 151c1 so as to perform information processing for user authentication. The RAM 151b is a memory for providing a memory space allowing software stored on the storage device 151c to be read thereon, and a work area required when the read software is executed by the CPU 151a. The storage device 151c is adapted to store/manage information, such as software and data, and typically configured as a hard disk drive. Preferably, the storage device 151c stores a file of programs of the OS 151c1, the browser application 151c2, the presentation-pattern creation module 151c3 and the client-ID acquisition module 151c4, and these programs will be read on the RAM 151b and executed. As for the OS 151c1, the browser application 151c2, the presentation-pattern creation module 151c3 and the client-ID acquisition module 151c4, the storage device 101c may be configured as a ROM storing the programs thereon. In this case, the ROM serves as a firmware in cooperation with a program execution element, such as the CPU 151a. The user I/F 151d is operable to allow data to be input/output from/to a user therethrough. Although not illustrated, the user I/F 151d is typically comprised of: key input device, such as a keyboard 196 or a software keyboard; output device, such as a display, for displaying information on a screen; and a hardware I/F between the key input device and the output device. The external/network I/F 151e is adapted to be connected to an external device equipped with an external communication interface, or a network, to allow information to be input/output therefrom/thereto. The authentication-requesting client 151 can acquire the client ID thereof from the external communication interface-equipped external device through the external/network I/F 151e. Further, the authentication-requesting clients 151 can be connected to the authentication server 101 through the external/network I/F 151e and via a network. As the external communication interface, it is possible to use various communication interface, such as a USB, or a non-contact communication interface including BlueTooth®, wireless LAN, infrared communication interface, Felica® and RFID. As the external device to be connected to the authentication-requesting client 151, it is possible to use a USB memory, a wireless-communication data card (USB connection, PC-card connection, Express Card connection, etc.), an IC card such as Felica® and RFID, a portable phone, a biological-authentication-information (fingerprint, iris, vein or the like) reader, etc.

The authentication-requesting client 151 is connected to a client-ID storage section 172 which stores its own client ID 102c to be acquired when used by the requesting user. In the present invention, as long as the authentication-requesting client 151 is capable of acquiring its own client ID 102c, it is not necessary to have the client-ID storage section 172. Although the client-ID storage section 172 may be located within a housing of the authentication-requesting client 151, it is only enough for the authentication-requesting client 151 to be capable of acquiring its own client ID 102c in some way. Thus, such a client-ID storage section 172 is not included as an essential element in the concept of the present invention.

As the client ID 102c to be acquired when the authentication-requesting client 151 is used by the requesting user, it is possible to use information incorporated in a hardware of the authentication-requesting client 151 (hardware-related information), information associated with software of the authentication-requesting client 151 (software-related information), information acquired from the external device connected to the authentication-requesting client 151 (external device-related information), biological information about the requesting user acquired from a biological-authentication-information reader incorporated in or connected to the authentication—requesting client 151 (biological authentication information), etc.

As for the hardware-related information, it is possible to use, as the client ID 102c, a serial number of a hardware component such as a CPU, a MAC (Media Access Control) address of a network interface card, a serial number of a hard disk or the like. In this case, the client-ID storage section 172 is configured as a storage area for the serial number of the hardware component such as a CPU, a storage area for the MAC address of the network interface card, a storage area for the serial number of the hard disk or the like. The hardware-related information may be acquired from a hardware storing it, via the bus, in such a manner that the hardware is subjected to an appropriate read operation.

As for the software-related information, it is possible to use, as the client ID 102c, a GUID (Globally Unique Identifier) or a product ID or a product key of a Windows® OS, an IP address of a TCP/IP network or the like. In this case, the client-ID storage section 172 is configured as a file on a hard disk (or a storage area on a memory) storing information about the GUID (Globally Unique Identifier) of the Windows® OS, a file on a hard disk (or a storage area on a memory) storing information about the product ID and the product key of the Windows® OS, a file on a hard disk (or a storage area on a memory) storing setting information about the IP address of the TCP/IP network or the like. The software-related information may be acquired from the file on the hard disk (or the storage area on the memory) storing it, using a command of the OS.

As for the external device-related information, it is possible to use, as the client ID 102c, a serial number of a USB memory, a serial number or a contractor ID or a phone number of a wireless communication data card or a portable phone, a serial number of a BlueTooth® or wireless LAN-equipped device, an ID number (serial number) of an IC card such as Felica® or RFID, or the like. In this case, the client-ID storage section 172 is configured as a storage area for the serial number of the USB memory, a storage area for the serial number or contractor ID or phone number of the wireless communication data card or the portable phone, a storage area for the serial number of the BlueTooth® or wireless LAN-equipped device, a storage area for the ID number (serial number) of the IC card such as Felica® or RFID, or the like. The external device-related information may be acquired from the external device storing it, through the external/network I/F 151e, by transmitting an appropriate read command to the external device.

As for the biological authentication information, it is possible to use, as the client ID 102c, biological authentication information which outputs by reading a given biological pattern suitable for verification of identity, such as fingerprint, iris or vein, using a biological-authentication-information reader. In this case, the client-ID storage section 172 is configured as an information processing means in the biological-authentication-information reader during the operation of reading a given biological pattern of the requesting user to output biological authentication information. This means that transforming a given fixed biological pattern of the requesting user to biological authentication information is equivalent to reading the client ID 102c from the client-ID storage section 172. The biological authentication information may be acquired from the biological-authentication-information reader reading a given biological pattern of the requesting user via the bus (in cases where the biological-authentication-information reader is incorporated in the authentication-requesting client) or the external/network I/F 151e (the biological-authentication-information reader is provided outside the authentication-requesting client), by transmitting an appropriate read command to the biological-authentication-information reader.

The OS 151c1, the browser application 151c2, the presentation-pattern creation module 151c3 and the client-ID acquisition module 151c4 may be partially or entirely combined together in the form of an integrated program. For example, the browser application 151c2 may include the functions of the presentation-pattern creation module 151c3 and/or the client-ID acquisition module 151c4. Alternatively, the OS 151c1 may include the functions of the browser application 151c2, the presentation-pattern creation module 151c3 and the client-ID acquisition module 151c4. Further, the browser application 151c2, the presentation-pattern creation module 151c3 and/or the client-ID acquisition module 151c4 may be incorporated in another application. Further, each of them may be divided into a plurality of programs.

The OS 151c1 is an operating system closely related to hardware of the authentication-requesting client 151 and adapted to perform fundamental information processing and serve as a fundamental program depending on the hardware of the authentication-requesting client 151. The OS 151c1 may be configured as a firmware having an architecture similar to a platform. The browser application 151c2 is an application software which operates on the OS 151c1 to access information provided on a network so as to display the information, and achieve a browser function for allowing a user to enter data therethrough. Typically, the browser application 151c2 is configured as a Web browser application for accessing a Web page on the Internet or an intranet. It is understood that the browser application 151c2 is not limited to the Web browser application, but may be any other suitable application capable of accessing a user authentication screen page provided on a network by the server. The browser application 151c2 may be configured as a firmware having an architecture similar to a platform for providing an API for displaying a screen page when another application performs authentication. The presentation-pattern creation module 151c3 is a program to be incorporated in the browser application 151c2 and executed to create a presentation pattern and display the created presentation pattern on a browser. In cases where the authentication-requesting client 151 is a PC, the presentation-pattern creation module 151c3 is typically configured as Java® applet, Active X® or Flash®. Even if the authentication-requesting client 151 is a portable phone or a PDA, there is a high possibility that a module can be incorporated in the browser application 151c2 in the near future, and the presentation-pattern creation module 151c3 will function in the form of such a module. The presentation-pattern creation module 151c3 may be configured as a firmware having an architecture similar to a platform for providing an API for allowing another application to perform authentication. The client-ID acquisition module 151c4 is a program to be incorporated in the browser application 151c2 and executed to acquire the client ID 102c from the authentication-requesting client 151 when used by the requesting user, and is a module having the same configuration as that of the presentation-pattern creation module 151c3.

When the authentication server 101 performs an authentication about logon to a Windows® domain network, the browser application 151c2 and the presentation-pattern creation module 151c3 for the authentication are incorporated in the OS 151c1 serving as a client Windows® OS, and operable to display a presentation pattern 191 on a Windows®-domain-network logon authentication screen of the authentication-requesting client 151 and prompt a user to go through an authentication procedure based on the authentication process of the present invention.

A standard Windows® logon authentication screen is specifically modified as follows. The following description will be made by taking Windows® XP as an example. Firstly, a logon authentication module which is a program for performing the functions of the browser application 151c2, the presentation-pattern creation module 151c3 and the client-ID acquisition module 151c4, is created as a Windows® DDL file. In this example, a DDL file having a name "SmxGina.dll" is created. Further, a program for a Windows® logon authentication screen is designated as data having a key with a name "GinaDLL" in the following registry location:

HKEY_LOCAL_MACHINE¥SOFTWARE¥Microsoft-¥WindowsNT¥CurrentVers ion¥Winlogon

A standard logon authentication module is a DLL file "msgina.dll", and this DLL file is configured as the above data having the key with the name "GinaDLL". When the data having this key is rewritten as "SmxGina.dll", a logon authentication module "SmxGinaDLL" implementing the authentication process of the present invention will be called during authentication such as logon authentication.

FIG. 8 is a schematic diagram illustrating images on logon authentication screens 197A, 197B in the two-factor user authentication system 100. When the logon authentication module "SmxGinaDLL" is activated during logon of Windows®, the logon authentication screen 197A is firstly displayed. A user-name input field and a logon-target input field are displayed on the logon authentication screen 197A. A network name can be entered into the logon-target input field to initiate a Windows®-domain-network logon authentication procedure for authorizing to use the network online When the requesting user enters his/her user ID as a requesting-user ID 181 into the user-name input field, the authentication module causes the requesting-user ID 181 to be transmitted to the authentication server 101, so as to create a presentation pattern 191 based on the requesting-user ID 181. Then, the logon authentication screen 197B including the presentation pattern 191 is displayed. The logon authentication screen 197B has a password input field. When characters, such as numerals, serving as a one-time password are entered into the password input field using the keyboard 196 or the like, marks "*" are displayed one-by-one in response to the input of the characters. After completion of the input of the one-time password 192, the authentication module causes the one-time password 192 to be transmitted to the authentication server 101 so as to perform user authentication, and then causes the authentication result to be transmitted to a domain controller.

[Functional Configuration of Two-Factor User Authentication System 100]

FIG. 2 is a functional block of the two-factor user authentication system 100 according to this embodiment. FIG. 2 is a diagram expressing the hardware configuration of the two-factor user authentication system 100 illustrated in FIG. 1, from the aspect of information processing to be performed based on cooperation between software and hardware resources, wherein the information processing is illustrated on a functional block-by-functional block basis. In FIG. 2, the authentication server 101 comprises the password storage section 102, authentication-request receiving section 103, verification-code creation section 106, one-time-password receiving section 107, user authentication section 122, pattern-seed-value generation section 104 and pattern-seed-value transmission section 105. These functional blocks are achieved appropriately in cooperation with hardware elements, such as the RAM 101b, the storage device 101c, the user I/F 101d and the network I/F 101e, under the condition that a required part of the user-authentication application 101c2 and a required part of the OS 101c1 are read from the storage device 101c onto the RAM 101b, and executed by the CPU 101a.

The password storage section 102 is a functional block configured to pre-stores user IDs 102a, one-time-password derivation rules 102b as passwords, and client IDs, in associated relation with each other on a user-by-user basis. This functional block is achieved based on cooperation between software and hardware elements, such as the CPU 101a, the RAM 101b and the storage device 101c. The authentication-request receiving section 103 is a functional block operable to receive, from the authentication-requesting client 151, an authenticate request including a requesting-user ID 181 entered in the authentication-requesting client 151. This functional block is achieved based on cooperation between software and hardware elements, such as the CPU 101a, the RAM 101b and the network I/F 101e. The pattern-seed-value generation section 104 is a functional block operable, in accordance with a given generation rule, to generate a pattern seed value 183 adapted to specify a presentation pattern in combination with one of the client IDs 102c. This functional block is achieved based on cooperation between software and hardware elements, such as the CPU 101a and the RAM 101b. The pattern-seed-value transmission section 105 is a functional block operable to transmit the generated pattern seed value 183 to the authentication-requesting client 151. This functional block is achieved based on cooperation between software and hardware elements, such as the CPU 101a, the RAM 101b and the network I/F 101e. The verification-code creation section 106 is a functional block operable to create a verification code 193 as a result of applying the one-time-password derivation rule 102b serving as a password of the requesting user, to a presentation pattern 191 presented to the authentication-requesting client 151. This functional block is achieved based on cooperation between software and hardware elements, such as the CPU 101a and the RAM 101b. The verification code 193 has a value identical to that of a proper one-time password 192 created as a result of applying a proper one-time-password derivation rule 102b to a proper presentation pattern. The one-time-password receiving section 121 is a functional block operable to receive, from the authentication-requesting client 151a, one-time password 192 entered in the authentication-requesting client 151. This functional block is achieved based on cooperation between software and hardware elements, such as the CPU 101a, the RAM 101b and the network I/F 101e. The user authentication section 122 is a functional block operable to compare the received one-time password 192 with the created verification code 193, and, if they are identical to one another, to successfully authenticate the requesting user. This functional block is achieved based on cooperation between software and hardware elements, such as the CPU 101a and the RAM 101b.

The authentication-requesting client 151 comprises user-ID input section 152, authentication-request transmission section 153, pattern-seed-value receiving section 154, pattern-element-sequence creation section 155, pattern display section 156, one-time-password input section 157, one-time-password transmission section 158 and client-ID acquisition section 171. These functional blocks are achieved appropriately in cooperation with hardware elements, such as the RAM 151b, the storage device 151c, the user I/F 151d and the external/network I/F 151e, under the condition that the presentation-pattern creation module 151c3, the client-ID acquisition module 151c4, a required part of the browser application 101c2, and a required part of the OS 151c1 are read from the storage device 151c onto the RAM 151b, and executed by the CPU 151a.

The user-ID input section 152 is a functional block operable to allow the requesting user to enter his/her user ID therefrom as a requesting-user ID 181. This functional block is achieved based on cooperation between software and hardware elements, such as the CPU 151a, the RAM 151b and the user I/F 151d. The authentication-request transmission section 153 is a functional block operable to transmit the entered requesting-user ID 181 to the authentication server 101. This functional block is achieved based on cooperation between software and hardware elements, such as the CPU 151a, the RAM 151b and the external/network I/F 151e. The pattern-seed-value receiving section 154 is a functional block operable to receive the pattern seed value 183 from the authentication server 101. This functional block is achieved based on cooperation between software and hardware elements, such as the CPU 151a, the RAM 151b and the external/network I/F 151e. The pattern-element-sequence creation section 155 is a functional block operable to create a plurality of pattern elements to be comprised in a presentation pattern, based on the pattern seed value 183 received from the authentication server 101 and the client ID 102c acquired in the authentication client 151 and in accordance with a given pattern-element-sequence creation rule. This functional block is achieved based on cooperation between software and hardware elements, such as the CPU 151a and the RAM 151b. The pattern display section 156 is a functional block operable to arrange a plurality of pattern elements of a pattern element sequence 190 created by the pattern-element-sequence creation section 155, in the given pattern format 191p to create a presentation pattern, and display the created presentation pattern on a screen. This functional block is achieved based on cooperation between software and hardware elements, such as the CPU 151a, the RAM 151b and the user I/F 151d. The one-time-password input section 157 is a functional block operable to allow the requesting user to enter a one-time password 192 through the presentation pattern displayed on the screen or the like. This functional block is achieved based on cooperation between software and hardware elements, such as the CPU 151a, the RAM 151b and the user I/F 151d. The one-time-password transmission section 158 is a functional block operable to transmit the entered one-time password 192 to the authentication server 101. This functional block is achieved based on cooperation between software and hardware elements, such as the CPU 151a, the RAM 151b and the external/network I/F 151e. The client-ID acquisition section 171 is a functional block operable to acquire the client ID 102c of the authentication-requesting client 151 when used by the requesting user. In cases where the client ID 102c is the hardware-related information or the software-related information, this functional block is achieved based on cooperation between software and hardware elements, such as the CPU 151a and the RAM 151b. In cases where the client ID 102c is the external device-related information, this functional block is achieved based on cooperation between software and hardware elements, such as the CPU 151a, the RAM 151b and the external/network I/F 151e.

[Operation of Two-Factor User Authentication System 100]

An operation of the two-factor user authentication system 100 will be described below. FIGS. 3 and 4 are flowcharts illustrating the operation of the two-factor user authentication system 100. A user subject to authentication based on the two-factor user authentication system 100 enters and registers his/her user ID 102a, a one-time-password derivation rule 102b serving as a password of the user, and a client ID 102c of the authentication-requesting client 151 to be used by the user during authentication, into/on the authentication server 101, in advance. In advance of user authentication, the password storage section 102 stores user IDs 102a, one-time-password derivation rules 102b and client IDs, in associated relation with one another on a user-by-user basis (Step S101). Preferably, the authentication server 101 provides, for example, an initial registration Web page for registration of a user ID, a password and a client ID 102c, on the Web of the Internet or an intranet. Through the initial registration Web page, a user accesses the authentication server 101 from a terminal, such as the authentication-requesting client 151. In response to the access, an input field for entering a user ID therethrough, and a first presentation pattern 191 having numerals 0 (zero) to 9 serving as pattern elements arranged in random order (not illustrated), are displayed on a screen of the authentication-requesting client 151. The user enters a desired user ID 102a to be registered, into the input field. Then, the user selects certain ones of the pattern elements included in the first presentation pattern 191 at specific positions and enters one or more characters, such as fixed numerals, without being based on the first presentation pattern 191, in accordance with a selected one-time-password derivation rule 102b to be registered. The authentication server 101 stores the entered user ID 102a on the password storage section 102 as a user ID of the user. The selected one-time-password derivation rule 102b cannot be ascertained only by the selected or entered numeric sequence. Thus, the authentication server 101 displays a second presentation pattern 191 different from the first presentation pattern to prompt the user to select or enter numerals again, in accordance with the selected one-time-password derivation rule 102b, and then compares this select or enter numeric sequence with the previous numeric sequence to ascertain the selected one-time-password derivation rule 102b. The second presentation pattern 191 can be generated to become largely different from the first present pattern 191. In this case, the selected one-time-password derivation rule 102b can be generally ascertained by presenting the presentation pattern 191 only twice. If the selected one-time-password derivation rule 102b cannot be ascertained by presenting the presentation pattern 191 twice, the presentation pattern 191 will be repeatedly presented while changing the content thereof until the selected one-time-password derivation rule 102b can be ascertained. In this manner, the selected one-time-password derivation rule 102b consisting of a combination of respective positions of certain ones to be selected from the pattern elements comprised in the presentation pattern 191, one or more fixed characters to be entered without being based on the presentation pattern 191, and a selection or input order of the certain pattern elements and the fixed characters is ascertained. The ascertained one-time-password derivation rule 102b is stored on the password storage section 102 in associated relation with the user ID 102a of the user. Preferably, the initial registration Web page is configured to allow software necessary for the authentication-requesting client 151, such as the presentation-pattern creation module 151c3 and/or the client-ID acquisition module 151c4, to be downloaded therefrom. This makes it possible to form the pattern-element-sequence creation section 155 and/or the client-ID acquisition section 171 in any PC accessing the initial registration Web page so as to allow the PC to operate as an authentication-requesting client 151.

When the authentication-requesting client 151 accesses the authentication server 101 to register his/her user ID 102a and one-time password derivation rule 102b, the client-ID acquisition section 171 is activated to acquire a client ID 102c acquirable by the authentication-requesting client 151, and transmit the client ID 102c to the authentication server 101. This operation may be performed before or after the registration of the client ID 102c and the one-time password derivation rule 102b. During the operation, the initial registration Web page selectably displays various acquisition sources for a client ID 102c (such as a CPU, a MAC address, a hard disk, a GUID or product ID or product key of Windows® OS, an IP address, a USB memory, a wireless communication data card, a portable phone, a BlueTooth® or wireless LAN-equipped device, Felica®, RFID, a biological authentication information reader, and a device having the client-ID storage section 172). In this case, it is preferable to scanningly ascertain a client ID acquirable by the client-ID acquisition section 171, via the bus and the external/network IF so as to display only an acquisition source which allows a client ID to be acquired therefrom. Alternatively, an administrator of the two-factor user authentication system 100 may pre-set one or more acquisition sources for a client ID 102c to omit the selection of an acquisition source by a user. When the user selects one of the displayed acquisition sources, a client ID 102c is read from the selected acquisition source by the client-ID acquisition section 171. It is understood that the user may select two or more of the acquisition sources. In this case, a plurality of types of client IDs 102c from the selected acquisition sources may be simultaneously combined with a pattern seed value 183 to create a presentation pattern 191, so that the number of authentication factors can be substantially increased up to three or more. The read client ID 102c is transmitted to the authentication server 101. Then, the authentication server 101 stores and registers the received client ID 102c on the password storage section 102a in associated relation with the user ID 102a and the one-time-password derivation rule 102b of the user. After completion of the above registration operation, the user becomes able to obtain authentication based on the two-factor user authentication system 100. It is preferable that, in connection with registration of a client ID 102c, information about an acquisition source for the client ID 102c is stored on an appropriate storage area. This is because, when the user is subjected to authentication, the acquisition source for the client ID 102c can be automatically set using the stored acquisition-source information. The acquisition-source information may be stored on a given storage area provided in the storage device 151c of the authentication-requesting client 151, in associated relation with the user ID 102a of the user. Alternatively, the two-factor user authentication system 100 may be configured such that the acquisition-source information is stored on the authentication server 101 together with the client ID 102c, and, during user authentication, the stored acquisition-source information is transmitted from the authentication server 101 to the authentication-requesting client 151.

Then, one of the users who requests authentication, i.e., a requesting user, enters his/her user ID as a requesting-user ID 181 through the user-ID input section 152 in the authentication-requesting client 151 (Step 103). Typically, the user accesses a user authentication Web page provided by the authentication server 101, using the browser application 151c2 running on the authentication-requesting client 151, and enters his/her user ID into a user-ID input field displayed on the Web page. In a Windows®-domain-network login authentication, the user enters his/her user ID and a network name as a logon target, respectively, into the user-name input field and the logon-target input field in the logon authentication screen 197A illustrated in FIG. 8. Then, the authentication-requesting client 151 transmits an authentication request including the entered requesting-user ID 181 to the authentication server 101 (Step S105). Typically, the browser application 151c2 running on the authentication-requesting client 151 transmits the requesting-user ID 181 entered into the input field, to the authentication server 101 through the Internet or an intranet. In the Windows®-domain-network login authentication, the logon authentication module "SmxGinaDLL" transmits the requesting-user ID 181 to the authentication server 101. Then, the user-ID receiving section 103 in the authentication server 101 receives the requesting-user ID 181 transmitted from the authentication-requesting client 151 (Step S107). Typically, the authentication server 101 activates the user-authentication application 101c2 to receive the authentication request including the requesting-user ID 181, according to the user-authentication application 101c2. Then, the pattern-seed-value generation section 104 in the authentication server 101 generates a pattern seed value 183 in accordance with a given generation rule (Step S109).

Figure 5:
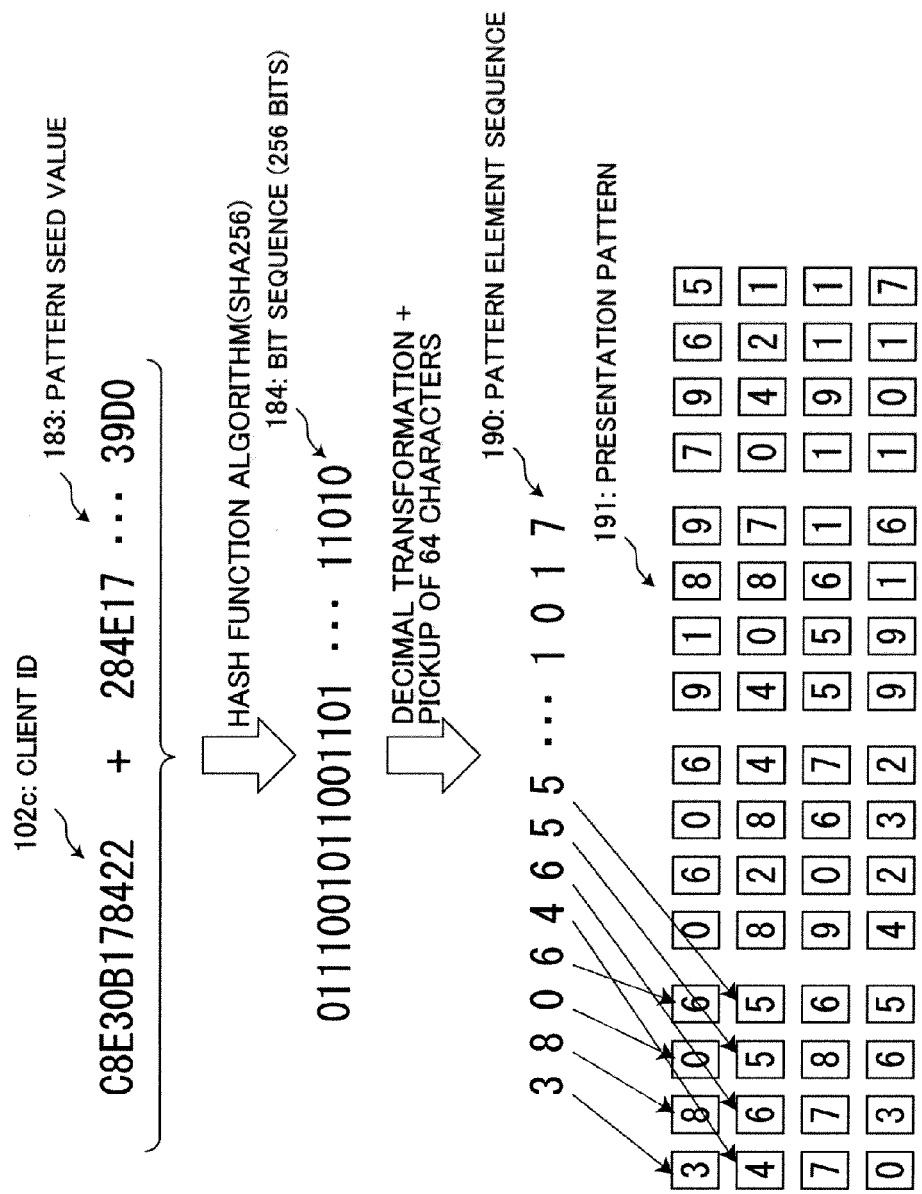
FIG. 5 is a conceptual diagram illustrating a process of creating a presentation pattern, in the two-factor user authentication system 100.

Typically, the given generation rule is to generate random numbers within a given range. As one example of the pattern seed value 183, FIG. 5 illustrates "284E17- - - 39D0" expressed in hexadecimal. For example, the pattern seed value 183 may be expressed by a numeric sequence having a given bit length, such as 16-byte. In this case, the given range is a range of "0000000000000000" to "FFFFFFFFFFFFFFFF" in hexadecimal. Thus, the number of different presentation patterns 191 to be created can be increased up to the number of pattern seed values included in the given range.

Then, the pattern-seed-value transmission section 105 in the authentication server 101 transmits the generated pattern seed value 183 to the authentication-requesting client 151 (Step S111). Typically, the authentication server 101 activates the user-authentication application 101c2 to transmit the pattern seed value 183 to the authentication-requesting client 151 according to the user-authentication application 101c2. Then, the pattern-seed-value receiving section 154 in the authentication-requesting client 151 receives the pattern seed value 183 transmitted from the authentication server 101 (Step S113). Typically, the pattern seed value 283 is received according to the browser application 151c2 or the logon authentication module "SmxGinaDLL" running on the authentication-requesting client 151. Then, the authentication-requesting client 151 prompts the user to select at least one of a plurality of acquisition sources for a client ID 102c, and the client-ID acquisition section 171 acquires a client ID 102c from the selected acquisition source (Step S115). In cases where an acquisition source is registered in connection with registration of the client ID 102c, and stored on a given area in the storage device 151c, an acquisition source for a client ID 102c is automatically set based on information about the stored acquisition source in the authentication-requesting client 151. On the other hand, in cases where an acquisition source is registered in connection with registration of the client ID 102c, and stored on the authentication server 101, information about the stored acquisition source is transmitted from the authentication server 101 to the authentication-requesting client 151, and the authentication-requesting client 151 an acquisition source for a client ID 102c is automatically set based on the transmitted acquisition-source information in the authentication-requesting client 151. In the above cases, it is not necessary for the user to select at least one of a plurality of acquisition sources for a client ID 102c. Then, the pattern-element-sequence creation section 155 in the authentication-requesting client 151 creates a pattern element sequence 190 for forming a presentation pattern

191, based on the pattern seed value 183 received in Step S113 and the client ID 102c acquired in Step S115 and in accordance with a given pattern-element-sequence creation rule (Step S117). The given pattern-element-sequence creation rule means a rule for creating a pattern element sequence uniquely specified based on a combination of the pattern seed value 183 and the client ID 102c, in such a manner as to provide significant difficulty in inferring the original requesting-user ID 181 and pattern seed value 183 from only the pattern element sequence. Typically, the given pattern-element-sequence creation rule is based on an encryption algorithm using the combination of the pattern seed value 183 and the client ID 102c as a sort of initial value, as described in more detail below. FIG. 5 is a conceptual diagram illustrating a process of creating a presentation pattern 191. In FIG. 5, a pattern element sequence 190 is created based on "284E17 - - - 39D0" as a pattern seed value 183 and "C8E30B178422x" as a client ID 190. For this purpose, a given numeric sequence is uniquely created based on the combination of the pattern seed value 183 and the client ID 102c. In an example indicated by the uppermost row and the second row in FIG. 5, the combination of the pattern seed value 183 and the client ID 102c each expressed in hexadecimal are combined together to create a given numeric sequence. Alternatively, the pattern seed value 183 and the client ID 102c may be combined together using any suitable operation, such as addition, subtraction and/or exclusive-OR operation. Then, the given numeric sequence is subjected to an encryption algorithm to create a bit sequence 184 having a given bit length. In FIG. 5, the given bit length is 256 bits which is an information amount enough to create a presentation pattern 191 consisting of sixty four numerals. The encryption algorithm may be any suitable type capable of practically precluding an original numeric sequence from being derived from an algorithmic result, such as a hash function algorithm or a symmetric-key encryption algorithm. For example, SHA-256 may be used as a hash function to encrypt the given numeric sequence so as to create a bit sequence 184 of 256 bits. Alternatively, the Advanced Encryption Standard (AES) algorithm may be used as a symmetric-key encryption algorithm to create a key from the given numeric sequence, and encrypt a 256-bit numeric sequence appropriately pre-set using the key so as to create a bit sequence 184 of 256 bits. Further, a hash function algorithm and a symmetric-key encryption algorithm may be used in combination. The values "0111001011001101 - - - 11010" of the bit sequence 184 in FIG. 5 are shown as one example for illustrative purposes, but not shown as an accurate algorithmic result of the SHA-256 algorithm. Then, the bit sequence 184 of 256 bits is transformed to a seventy seven-digit decimal numeral, and a sixty four-digit numeral is extracted therefrom and used as a pattern element sequence 190. The values "38064655 - - - 1017" of the patter element sequence 190 in FIG. 5 are shown as one example for illustrative purposes, but not shown as an accurate result of the conversion/extraction. The sixty four-digit numeral may be extracted by eliminating unnecessary higher-order bits or lower-order bits, or using any suitable calculation, such as subtraction. Then, the pattern display section 156 in the authentication-requesting client 151 creates an image of a presentation pattern 191 formed by arranging pattern elements of the pattern element sequence 190, respectively, at element positions in a given pattern format consisting of four 4-by-4 matrixes, and displays the image on the screen of the authentication-requesting client 151 (Step S119). In the Windows®-domain-network login authentication, as illustrated in FIG. 8, after the display of the logon authentication screen 197A, the logon authentication screen 197B including the presentation pattern 191 is displayed.

Then, the user requesting authentication selects certain ones of the pattern elements (each selected from one-digit numerals 0 to 9) at specific positions in the presentation pattern 191 displayed on the screen of the authentication-requesting client 151 and enters one or more characters, such as fixed numerals, without being based on the presentation pattern 191, in a given order, so as to enter, into the authentication-requesting client 151, a one-time password 192 created as a result of applying the one-time-password derivation rule 102b of the user to the presentation pattern 191. The one-time-password input section 157 in the authentication-requesting client 151 allows the user to enter the one-time password 192 therethrough (Step S121). Then, the one-time-password transmission section 158 in the authentication-requesting client 151 transmits the entered one-time password 192 to the authentication server 101 (Step S123). Then, the one-time-password receiving section 121 in the authentication server 101 receives the one-time password 192 transmitted from the authentication-requesting client 151 (Step S125).

Then, the verification-code creation section 106 in the authentication server 101 creates a verification code 193 as a result of applying the pre-stored one-time-password derivation rule 102b associated with the requesting-user ID 181 received from the authentication-requesting client 151, to a presentation pattern formed from a pattern element sequence created based on the pattern seed value 183 transmitted to the authentication-requesting client 151 and the requesting-user ID 181 and in accordance with a given pattern-element-sequence creation rule (Step S127). The given pattern-element-sequence creation rule used in Step S127 is identical to the pattern-element-sequence creation rule used by the pattern-element-sequence creation section 155 to create the pattern sequence in Step S117. Thus, the verification code 193 has a value identical to that of a proper one-time password 192 created as a result of applying a proper one-time-password derivation rule 102b associated with a requesting-user ID 181 of a proper user of, to a proper presentation pattern created based on a proper pattern seed value 283 and a proper client ID associated with the user corresponding to the requesting-user ID 181. Then, the user authentication section 122 in the authentication server 101 compares the received one-time password 192 and the created verification code 193, and, if they are identical to one another, determines that the user is successfully authenticated (Step S129). If the authentication is successfully concluded, the use of a service depending on the user authentication modes will be authorized as follows. In the user authentication mode for authorizing a user to use a specific content on the Web or the like, the user is authorized to access the content or to use an application. In the authentication mode for authorizing a user to logon to a Windows® domain network, the authentication server 101 informs the authentication result to a Windows® domain controller to authorize the user to log into the Windows® network. In the authentication server 101 configured as a SSL-VPN gateway, the user is authorized to access the SSL-VPN.

As a prerequisite to allowing a plurality of types of client IDs 102c to be simultaneously combined with a pattern seed value 183 so as to create a presentation pattern 191 in order to substantially increase the number of authentication factors up to three or more, the above embodiment of the present invention may be modified to use a plurality of types of client IDs in the means or step in which a client ID 102c is handled. Specifically, the two-factor user authentication system may configured as follows: the password storage section 102 pre-storing respective user IDs of a plurality of users, respective one-time-password derivation rules of the users, and respective client ID groups of the clients to be used by the respective users as the authentication-requesting client, in associated relation with each other on a user-by-user basis, wherein each of the client ID groups consists of a plurality of types of client IDs; the pattern-seed-value generation section 104 is operable, in accordance with the given generation rule, to generate a pattern seed value adapted to uniquely specify a presentation pattern in combination with one of the client ID groups; the client-ID acquisition section 171 is operable to acquire the client ID group 102c identifying the authentication-requesting client 151 when used by the requesting user; the pattern-element-sequence creation section 155 is operable, based on the received pattern seed value and the acquired client ID group and in accordance with the given pattern-element-sequence creation rule, to create a pattern element sequence consisting of a set of pattern elements for forming a presentation pattern; and the verification-code creation section 106 is operable to create a verification code as a result of applying the pre-stored one-time-password derivation rule associated with the received user ID, to certain pattern elements included in a presentation pattern formed from a pattern element sequence which is created based on the transmitted pattern seed value and the pre-stored client ID group associated with the received user ID and in accordance with the given pattern-element-sequence creation rule.

In the above operational flow, as long as any inconsistency in operational flow, such as a situation where data obviously unusable in a certain step is used in the step, does not occur, the operational flow may be freely modified. For example, although a verification code 193 is created by the authentication server 101 in Step S127, it may be created just after Step S109 where both of the requesting-user ID 181 and the pattern seed value 183 become available.

The preferred embodiment of the present invention has been described for illustrative purposes, but the present invention is not limited to the specific embodiment. It is obvious to those skilled in the art that various changes and modifications may be made therein without departing from the spirit and scope thereof as set forth in appended claims.

EXPLANATION I/F CODES

100: two-factor user authentication system
101: authentication server
101a: CPU
101b: RAM
101c: storage device
101c1: OS
101c2: user-authentication application
101d: user interface (user I/F)
101e: network interface (network I/F)
102: password storage section
102a: user ID
102b: one-time-password derivation rule
102c: client ID
103: authentication-request receiving section
104: pattern-seed-value generation section
105: pattern-seed-value transmission section
106: verification-code creation section
121: one-time-password receiving section
122: user authentication section
151: authentication-requesting client
151a: CPU
151b: RAM
151c: storage device
151c1: OS
151c2: browser application
151c3: presentation-pattern creation module
151c4: client-ID acquisition module
151d: user interface (user I/F)
151e: network interface (network I/F)
152: user-ID input section
153: authentication-request transmission section
156: pattern display section
157: one-time-password input section
158: one-time-password transmission section
154: pattern-seed-value receiving section
155: pattern-element-sequence creation section
171: client-ID acquisition section
172: client-ID storage section
181: requesting-user ID
183: pattern seed value
184: bit sequence
190: pattern-element sequence
191: presentation pattern
191p: given pattern format
192: one-time password
193: verification code
196: keyboard
197A: logon authentication screen
197B: logon authentication screen

What is claimed is:

1. A two-factor user authentication system designed to use a one-time-password derivation rule as a password of a user subject to authentication, in such a manner that a plurality of pattern elements are arranged in a given pattern format and presented as a presentation pattern to a client being used by the user, and the one-time-password derivation rule is applied to certain ones of the pattern elements included in the presentation pattern at specific positions, so as to create a onetime password, and further use information identifying the client being used by the user, as a second authentication factor, the two-factor user authentication system comprising:

an authentication server for authenticating a plurality of the users, the authentication server comprising a processor and a memory to perform information processing; and a plurality of the clients each connected to the authentication server via a network to serve as an authentication-requesting client when it is used as a terminal for allowing each of the users to request authentication therethrough, each of the clients comprising a processor and a memory to perform information processing, wherein the authentication server includes:

a password storage section pre-storing respective user IDs of the users, respective one-time-password derivation rules of the users, and respective client IDs of the clients to be used by the respective users as the authentication-requesting client, in associated relation with each other on a user-by-user basis;

pattern-seed-value generation section operable, in accordance with a given generation rule, to generate a pattern seed value adapted to uniquely specify a presentation pattern in combination with one of the client IDs;

user-ID receiving section operable to receive the user ID of one of the users who requests authentication, from the authentication-requesting client; and pattern-seed-value transmission section operable to transmit the generated pattern seed value to the authentication-requesting client of the requesting user, and wherein the authentication-requesting client includes:
user-ID input section operable to allow the requesting user to enter his/her user ID therefrom;
user-ID transmission section operable to transmit the entered user ID to the authentication server;
pattern-seed-value receiving section operable to receive the pattern seed value transmitted from the authentication server;
client-ID acquisition section operable to acquire the client ID of the authentication-requesting client when used by the requesting user;
pattern-element-sequence creation section operable, based on the received pattern seed value and the acquired client ID and in accordance with a given pattern-element-sequence creation rule, to create a pattern element sequence consisting of a set of pattern elements for forming a presentation pattern;
pattern display section operable to arrange the pattern elements comprised in the created pattern element sequence, in the given pattern format to create the presentation pattern, and display the created presentation pattern on a screen;
one-time-password input section operable to allow the requesting user to enter therefrom a one-time password created as a result of applying the one-time-password derivation rule of the requesting user to certain ones of the pattern elements included in the displayed presentation pattern; and
one-time-password transmission section operable to transmit the entered one-time password to the authentication server,
and wherein the authentication server further includes:
one-time-password receiving section operable to receive the transmitted one-time password;
verification-code creation section operable to create a verification code as a result of applying the pre-stored one-time-password derivation rule associated with the received user ID, to certain pattern elements included in a presentation pattern formed from a pattern element sequence which is created based on the transmitted pattern seed value and the pre-stored client ID associated with the received user ID and in accordance with the given pattern-element-sequence creation rule; and
user authentication section operable to compare the received one-time password with the created verification code, and, if they are identical to one another, to successfully authenticate the user corresponding to the received user ID.

2. The two-factor user authentication system as defined in claim 1, wherein:
the password storage section pre-stores respective user IDs of the users, respective one-time-password derivation rules of the users, and respective client ID groups of the clients to be used by the respective users as the authentication-requesting-client, in associated relation with each other on a user-by-user basis, wherein each of the client ID groups consists of a plurality of types of client IDs;
the pattern-seed-value generation section is operable, in accordance with the given generation rule, to generate a pattern seed value adapted to uniquely specify a presentation pattern in combination with one of the client ID groups;
the client-ID acquisition section is operable to acquire the client ID group of the authentication-requesting client when used by the requesting user;

the pattern-element-sequence creation section is operable, based on the received pattern seed value and the acquired client ID group and in accordance with the given pattern-element-sequence creation rule, to create a pattern element sequence consisting of a set of pattern elements for forming a presentation pattern; and
the verification-code creation section is operable to create a verification code as a result of applying the pre-stored one-time-password derivation rule associated with the received user ID, to certain pattern elements included in a presentation pattern formed from a pattern element sequence which is created based on the transmitted pattern seed value and the pre-stored client ID group associated with the received user ID and in accordance with the given pattern-element-sequence creation rule.

3. The two-factor user authentication system as defined in claim 1, wherein:
the pattern-seed-value generation section is operable, in accordance with the given generation rule, to generate a pattern seed value adapted to uniquely specify a presentation pattern in combination with one of the user IDs and one of the client IDs;
the pattern-element-sequence creation section is operable, based on the received pattern seed value, the entered user ID, and the client ID of the authentication-requesting client acquired when used by the requesting user and in accordance with the given pattern-element-sequence creation rule, to create a pattern element sequence consisting of a set of pattern elements for forming a presentation pattern; and
the verification-code creation section is operable to create a verification code as a result of applying the pre-stored one-time-password derivation rule associated with the received user ID, to certain pattern elements included in a presentation pattern formed from a pattern element sequence which is created based on the received user ID, the transmitted pattern seed value and the pre-stored client ID associated with the received user ID and in accordance with the given pattern-element-sequence creation rule.

4. The two-factor user authentication system as defined in claim 1, wherein the client-ID acquisition section is operable to acquire identification information incorporated in hardware of the authentication-requesting client.

5. The two-factor user authentication system as defined in claim 1, wherein the client-ID acquisition section is operable to acquire identification information about an operating system of the authentication-requesting client.

6. The two-factor user authentication system as defined in claim 1, wherein the client-ID acquisition section is operable to acquire a network address set for the authentication-requesting client.

7. The two-factor user authentication system as defined in claim 1, wherein the client-ID acquisition section is operable to acquire identification information about an external device through an interface of the authentication-requesting client.

8. The two-factor user authentication system as defined in claim 1, wherein the client-ID acquisition section is operable to acquire biological identification information about the requesting user.

9. A two-factor user authentication method for use in a user authentication system designed to use a one-time-password derivation rule as a password of a user subject to authentication, in such a manner that a plurality of pattern elements are arranged in a given pattern format and presented as a presentation pattern to a client being used by the user, the client comprising a processor and a memory to perform information processing, and the one-time-password derivation rule is applied to certain ones of the pattern elements included in the presentation pattern at specific positions so as to create a one-time password, and further use information identifying the client being used by the user, as a second authentication factor, wherein the user authentication system includes a plurality of the clients each serving as an authentication-requesting client when it is used as a terminal for allowing each of a plurality of the users to request authentication therethrough, and an authentication server connected to the authentication-requesting client via a network, the authentication server comprising a processor and a memory to perform information processing, and the authentication server being operable, in response to an authentication request from the authentication-requesting client, to perform authenticate each of the users, the two-factor user authentication method comprising:

pre-storing, in the authentication server, respective user IDs of the users, respective one-time-password derivation rules of the users, and respective client IDs of the clients to be used by the respective users as the authentication-requesting client, in associated relation with each other on a user-by-user basis;

allowing one of the users who requests authentication, to enter his/her user ID from the authentication-requesting client;

causing the authentication-requesting client to transmit the entered user ID to the authentication server;

causing the authentication server to receive the user ID of the requesting user transmitted from the authentication-requesting client;

causing the authentication server to, in accordance with a given generation rule, generate a pattern seed value adapted to uniquely specify a presentation pattern in combination with one of the client IDs;

causing the authentication server to transmit the generated pattern seed value to the authentication-requesting client of the requesting user;

causing the authentication-requesting client to receive the pattern seed value transmitted from the authentication server;

causing the authentication-requesting client to acquire the client ID of the authentication-requesting client when used by the requesting user;

causing the authentication-requesting client to, based on the received pattern seed value and the acquired client ID and in accordance with a given pattern-element-sequence creation rule, create a pattern element sequence consisting of a set of pattern elements for forming a presentation pattern;

causing the authentication-requesting client to arrange the pattern elements comprised in the created pattern element sequence, in the given pattern format to create the presentation pattern, and display the created presentation pattern on a screen;

allowing the requesting user to enter, into the authentication-requesting client, a one-time password created as a result of applying the one-time-password derivation rule of the requesting user to certain ones of the pattern elements included in the displayed presentation pattern;

causing the authentication-requesting client to transmit the entered one-time password to the authentication server;

causing the authentication server to receive the one-time password transmitted from the authentication-requesting client of the requesting user;

causing the authentication server to create a verification code as a result of applying the pre-stored one-time-password derivation rule associated with the received user ID, to certain pattern elements included in a presentation pattern formed from a pattern element sequence which is created based on the transmitted pattern seed value and the pre-stored client ID associated with the received user ID and in accordance with the given pattern-element- sequence creation rule; and causing the authentication server to compare the received one-time password with the created verification code, and, if they are identical to one another, successfully authenticate the user corresponding to said received user ID.

\* \* \* \* \*